(12) United States Patent
Kobayashi

(10) Patent No.: US 11,977,801 B2
(45) Date of Patent: May 7, 2024

(54) IMAGE PROCESSING APPARATUS, CONTROL METHOD, AND STORAGE MEDIUM

(71) Applicant: CANON KABUSHIKI KAISHA, Tokyo (JP)

(72) Inventor: Hiroaki Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/350,959

(22) Filed: Jul. 12, 2023

(65) Prior Publication Data

US 2024/0061631 A1 Feb. 22, 2024

(30) Foreign Application Priority Data

Aug. 22, 2022 (JP) ................. 2022-131799

(51) Int. Cl.
*G06F 3/12* (2006.01)

(52) U.S. Cl.
CPC ............ *G06F 3/1267* (2013.01); *G06F 3/121* (2013.01); *G06F 3/12* (2013.01)

(58) Field of Classification Search
None
See application file for complete search history.

(56) References Cited

U.S. PATENT DOCUMENTS 6,567,180 B1 * 5/2003 Kageyama ............ G06F 3/1204
358/1.14
2014/0368878 A1 * 12/2014 Asai ...................... H04N 1/0044
358/1.15

FOREIGN PATENT DOCUMENTS

JP 2021133622 A 9/2021

* cited by examiner

*Primary Examiner* — Darryl V Dottin
(74) *Attorney, Agent, or Firm* — ROSSI, KIMMS & McDOWELL LLP

(57) ABSTRACT

An image processing apparatus stores held print jobs on a storage apparatus, displays a list of the held print jobs that have been stored on the storage apparatus, and performs a display according to a state of the storage apparatus when displaying the list.

8 Claims, 19 Drawing Sheets

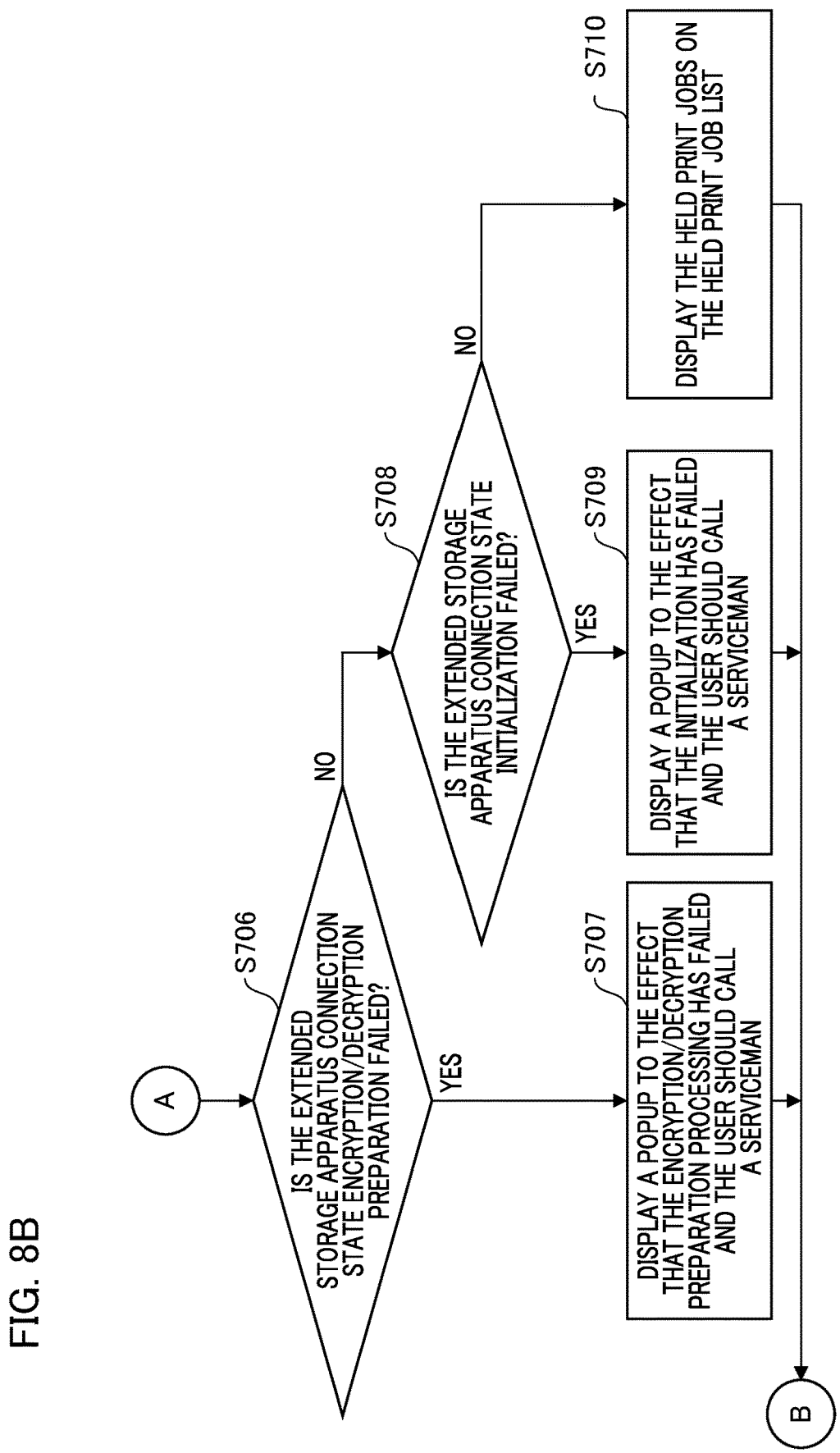

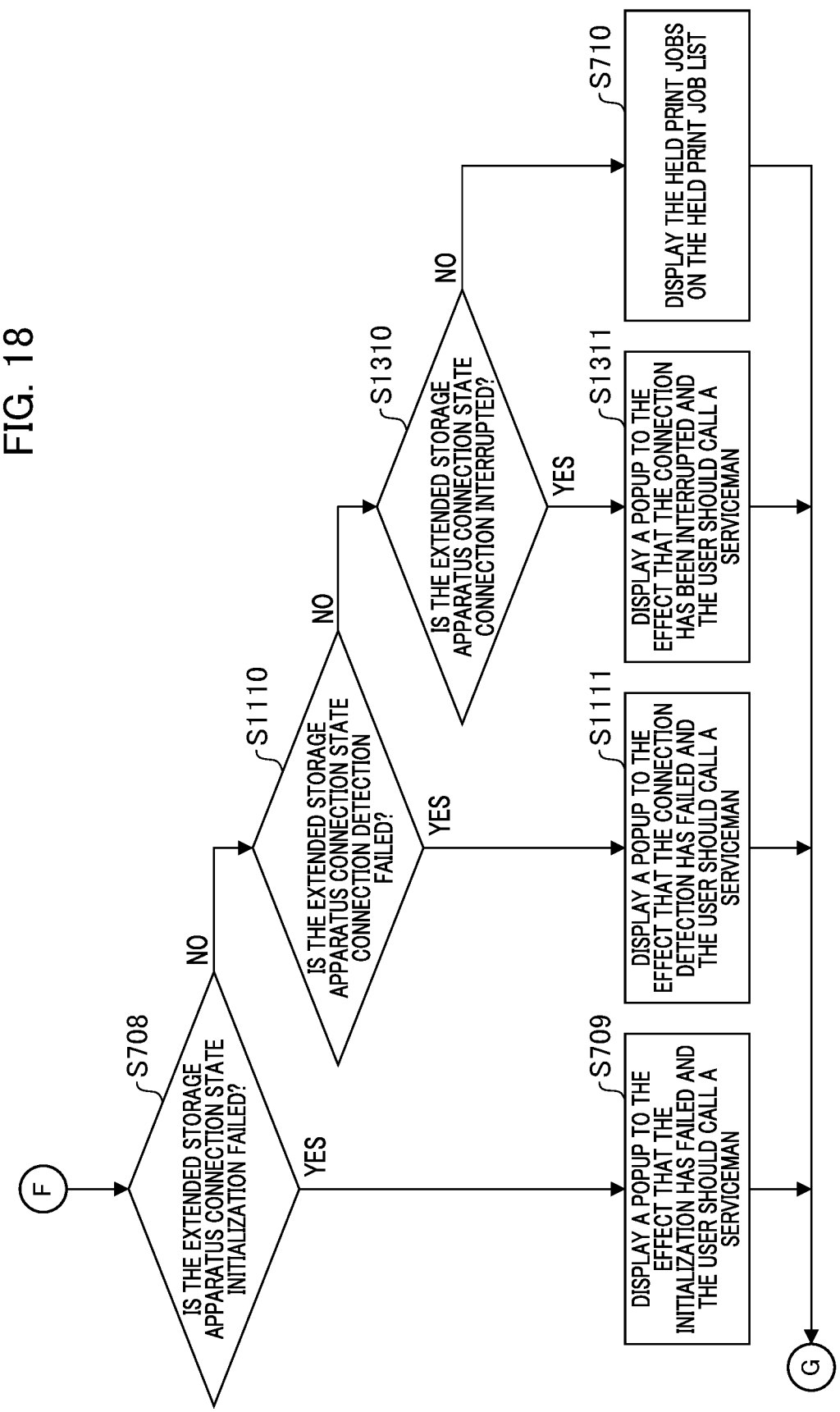

IMAGE PROCESSING APPARATUS, CONTROL METHOD, AND STORAGE MEDIUM

BACKGROUND OF THE INVENTION

Field of the Invention

The present invention relates to an image processing apparatus, a control method, a storage medium, and the like.

Description of the Related Art

In recent years there have been image processing apparatuses in which print jobs that have been submitted from a PC are temporarily held in an internal storage apparatus of the image processing apparatus, and a user is able to log into the image processing apparatus at an arbitrary timing and print the print job that they have submitted. In addition, it is also possible to install various devices in the image processing apparatus as options. One option is an extended storage apparatus, and by installing an extended storage apparatus, it becomes possible to increase the amount and size of the previously mentioned temporarily held print jobs However, due to the power supply to the image processing apparatus being slow when power is applied thereto, when it is rebooted after having been in sleep mood, or due to being physically separated, there are cases in which the extended storage apparatus cannot be detected as an optional device. In relation to this, Japanese Unexamined Patent Application, First Publication No. 2021-133622 discloses a technology in which the job execution history is recorded, and whether or not an optional device is installed is determined from the job execution history.

However, even if it is possible to determine if an extended storage apparatus is installed when power is applied to the image processing apparatus or when it is rebooted after being in sleep mood, when in a state in which the data from the extended storage apparatus cannot be referenced, it is not possible to provide the user with a list of the print jobs that have been stored on the extended storage apparatus. Therefore, a user who attempts to operate a print job immediately after applying power to the image processing apparatus will not be able to confirm the print data that has been held on the extended storage apparatus, however the user themselves will not be aware that the image processing apparatus is in a state in which it cannot reference the data that has been stored on the extended storage apparatus. Therefore, there has conventionally been room for improvement by increasing the usability.

SUMMARY OF THE INVENTION

The present invention provides an image processing apparatus with improved usability.

The image processing apparatus according to one aspect of the present invention has a storage means configured to store held print jobs on a storage apparatus, and a display means configured to display a list of the held print jobs that have been stored on the storage apparatus, wherein the display means performs a display according to a state of the storage apparatus when displaying the list.

Further features of the present invention will become apparent from the following description of exemplary embodiments with reference to the attached drawings.

BRIEF DESCRIPTION OF THE DRAWINGS

FIG. 8A and FIG. 8B are a flowchart showing one example of held print job list screen display processing procedures for an image processing apparatus.

FIG. 18 is a continuation of FIG. 17, and is a flowchart showing one example of held print job list screen display processing for an image processing apparatus.

DETAILED DESCRIPTION OF THE INVENTION

Below, embodiments for implementing the present application will be explained using the attached drawings.

First Embodiment

Figure 1:
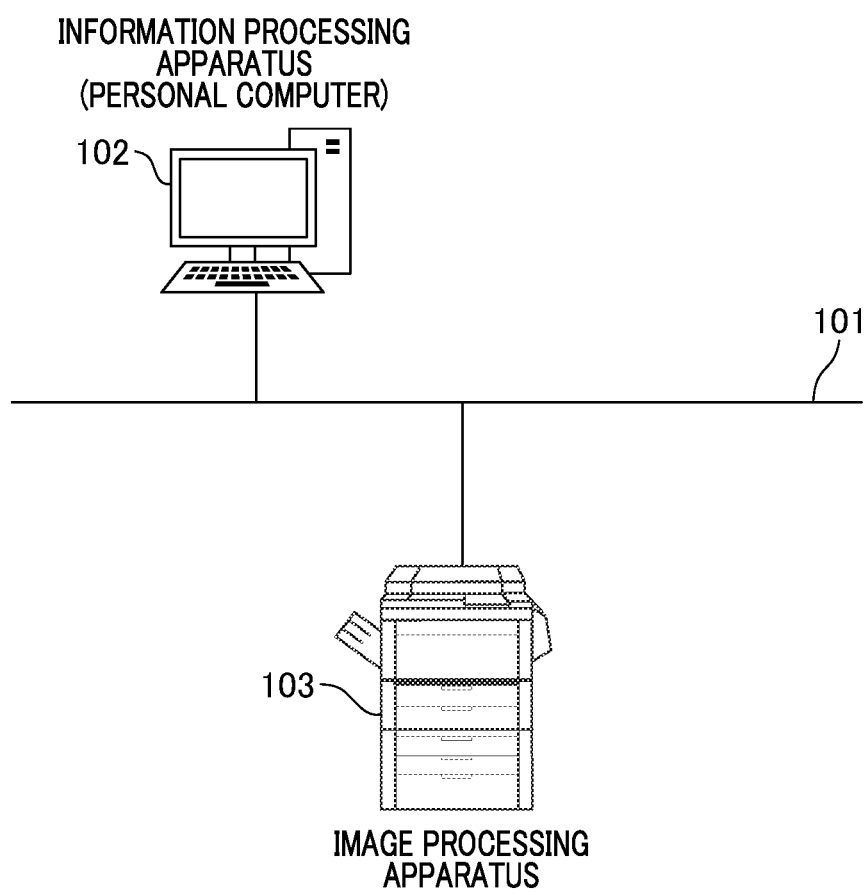
FIG. 1 is a diagram showing a configuration of a system according to the First Embodiment of the present invention.

FIG. 1 is a diagram showing a configuration of a system according to the First Embodiment of the present application. In the first Example, an example will be explained of a configuration in which an image processing apparatus 103, and an information processing apparatus 102 (for example, a personal computer), are connected via a network 101. In FIG. 1, the network 101 is a network that supports, for example, a TCP/IP protocol. TCP/IP is an abbreviation of Transmission Control Protocol/Internet Protocol.

Figure 2:
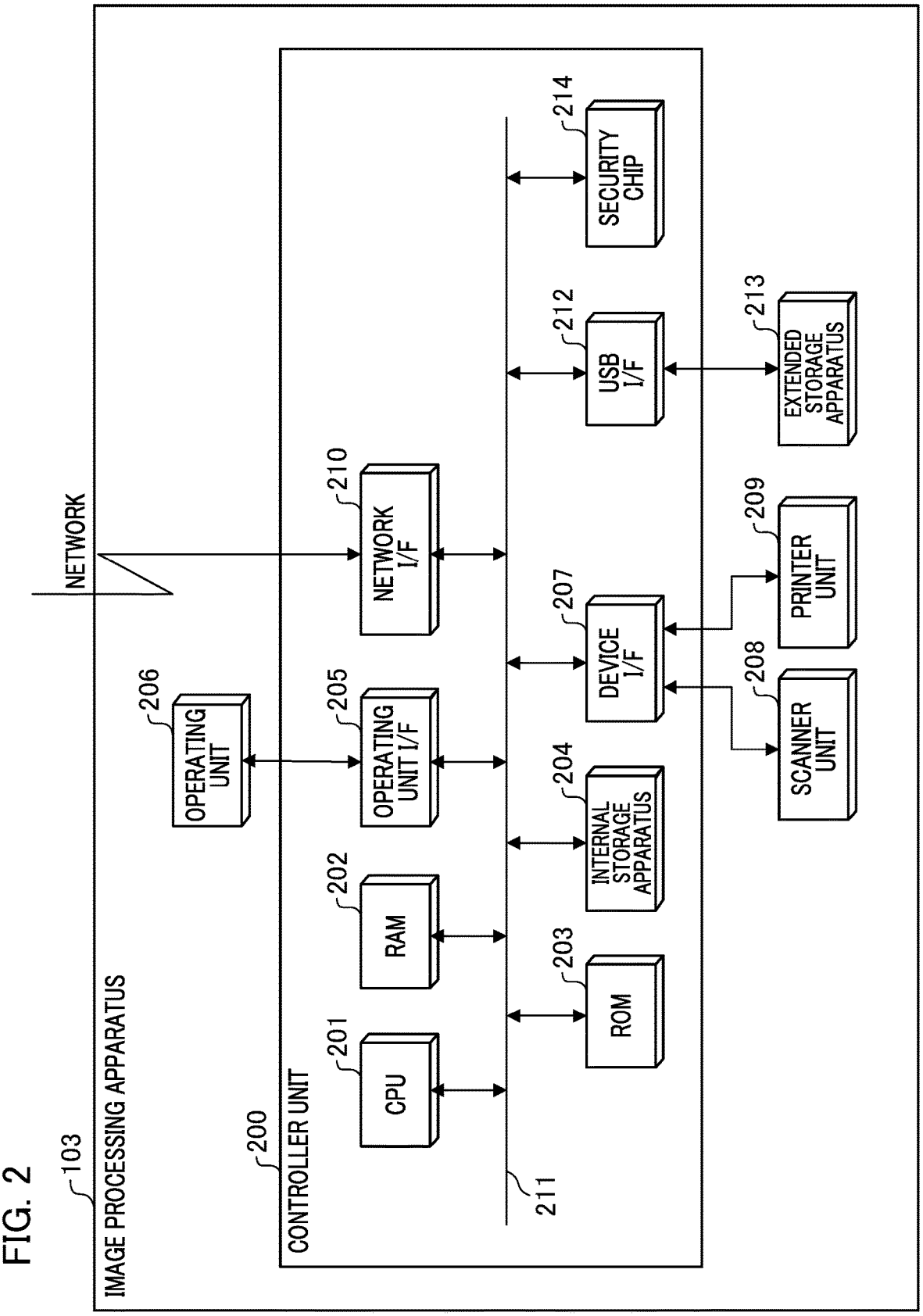
FIG. 2 is a block diagram showing an approximate configuration of an image processing apparatus.

FIG. 2 is a block diagram showing an approximate configuration of the image processing apparatus 103 according to the First Embodiment of the present invention. In FIG. 2, the image processing apparatus 103 has a controller unit 200, an operating unit 206, a scanner unit 208, a printer unit 209, and an extended storage apparatus 213. In the present embodiment, the image processing apparatus 103, which is an MFP (Multi-Function Peripheral) having a plurality of functions, is given as one example of an image processing apparatus. However, the present invention is not limited thereto. The image processing apparatus of the present invention may also be, for example, an SFP (Single Function Peripheral) with a single function having only a printing function.

The controller unit 200 is an apparatus that performs control of the entire image processing apparatus 103. The controller unit 200 has a CPU 201, a RAM 202, a ROM 203, an internal storage apparatus 204, an operating unit I/F 205, a device I/F 207, a network I/F 210, a USB I/F 212, and a security chip 214. The CPU 201, the RAM 202, the ROM 203, the internal storage apparatus 204, the operating unit I/F 205, the device I/F 207, the network I/F 210, the USB I/F 212, and the security chip 214 are connected to each other via a system bus 211. CPU is an abbreviation of Central Processing Unit. RAM is an abbreviation of Random-Access Memory. ROM is an abbreviation of Read Only Memory. I/F is an abbreviation of interface. USB is an abbreviation of Universal Serial Bus.

The CPU 201 integrally controls each apparatus that has been connected to the system bus 211, and controls the entirety of the image processing apparatus 103. The RAM 202 stores programs and data such as an operating system, system software, application software, and the like. The ROM 203 stores a boot program for the system, system programs, and the like. There are also cases in which the ROM 203 further stores the necessary information for the image processing apparatus such as fonts or the like.

The internal storage apparatus 204 is, for example, a hard disk drive. The internal storage apparatus 204 stores an operating system, system software, image data, settings data, an application program, print data sent to the printer from the information processing apparatus 102, bibliographic information for this print data, and the like. However, as will be explained below, after connection to the extended storage apparatus 213 is detected, the print data that has been sent to the printer from the information processing apparatus 102, and the bibliographic information for this print data is stored on the extended storage apparatus 213. The internal storage apparatus 204 may also be, for example, an eMMC (embedded Multi Media Card). The information processing apparatus 102 is able to transmit print data and the bibliographic information for this print data, and the like to the image processing apparatus 103 to serve as print jobs.

The program that has been stored on the RAM 202 is executed by the CPU 201. For example, the CPU 201 processes the image data and non-image data that has been stored on the RAM 202, the ROM 203, and the internal storage apparatus 204 by executing the program that has been stored on the RAM 202.

The operating unit OF 205 is an interface for the operating unit 206, and outputs image data to be displayed on the operating unit 206 to the operating unit 206. In addition, the operating unit I/F 205 transmits information that has been input by a user from the operating unit 206 to the CPU 201.

The operating unit 206, is for example is a touch panel on which display, and input are possible.

The device OF 207 connects the scanner unit 208 and printer unit 209, which are image input output devices, and the controller unit 200, and performs the input and output of image data. Image data that has been input from the scanner unit 208 via the device OF 207 is stored on the RAM 202 or the internal storage apparatus 204. Image processing or the like is executed on this stored image data according to necessity by an application program that has been stored on the RAM 202. In addition, the image data is output to the printer unit 209 via the device OF 207.

The network OF 210 connects to the network and performs the input and output of image data for an external device on the network, or of information that controls the image processing apparatus.

The extended storage apparatus 213 stores print data that has been sent to the printer from the information processing apparatus 102, and the bibliographic information for this print data. However, until connection to the extended storage apparatus 213 is detected, as was described above, the print data that has been sent to the printer from the information processing apparatus 102, and the bibliographic information for this print data are stored on the internal storage apparatus 204.

The security chip 214 stores an encryption/decryption control system 314, which will be described below. The security chip 214 is also used to store an encryption key that is used in the encryption/decryption of data inside the extended storage apparatus 213. In this context, the extended storage apparatus 213 may also be, for example an SSD (Solid State Drive).

Figure 3:
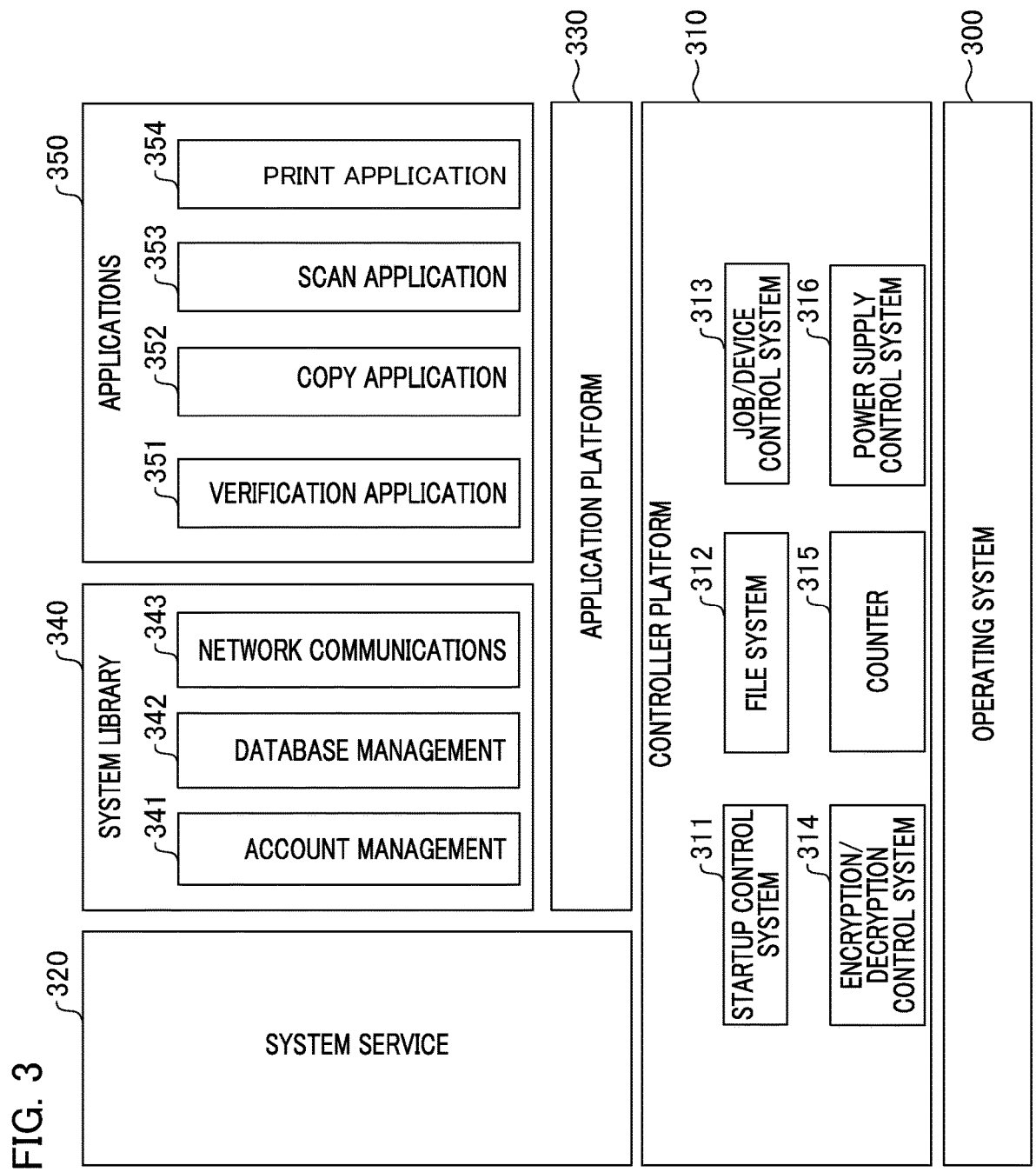
FIG. 3 is a block diagram showing a software configuration of an image processing apparatus.

FIG. 3 is a block diagram showing a software configuration of the image processing apparatus 103 according to the First Embodiment of the present invention. FIG. 3 shows a software configuration that is implemented by the controller unit 200. The software that is processed by the controller unit 200 that is built into the image processing apparatus 103 is implemented as so-called firmware, and is executed by the CPU 201.

An operating system 300 provides each type of resource management service and framework that have been optimized for the control of the integrated system for the software that operates thereon. Each type of resource management service that is provided by the operating system 300 is a multitask management that substantially operates a plurality of processing in parallel by managing a plurality of execution contexts for processing by the CPU 201. The operating system 300 also provides resource management services such as inter-task communication that realizes synchronization, and data exchange between tasks, and the like. Furthermore, the operating system 300 also provides memory management, interruption management, each type of device driver, a protocol stack that implements the processing for each type of protocol such as a local interface, a network, communications, and the like.

A controller platform 310 has a startup control system 311, a file system 312, a job/device control system 313, the encryption/decryption control system 314, a counter 315, and a power supply control system 316.

The startup control system 311 executes the startup processing that will be explained below in FIG. 4, and completes the startup of the image processing apparatus 103.

The file system 312 is a configuration for storing data that has been constructed on a storage apparatus such as the internal storage apparatus 204, the RAM 202, the extended storage apparatus, or the like. The file system 312 spools the jobs that are handled by the controller unit 200, and stores each type of data.

The job/device control system 313 controls the hardware for the image processing apparatus 103, and the extended storage apparatus 213. The job/device control system 313 controls jobs that use the basic functions (print, scan, communications, image conversion, or the like) that are primarily provided by the hardware.

The encryption/decryption control system 314 provides functions relating to the encryption/decryption of the extended storage apparatus 213. The encryption/decryption control system 314 encrypts all further writing to the extended storage apparatus 213, and is able to decrypt readings by reading the encryption key and settings that are used in the encryption/decryption at the time of a startup. Note that the encryption key is generated during the initial startup, and is stored on the security chip 214. In the present embodiment, an explanation of the generation of the encryption key is omitted.

The counter 315 manages the counter value based on a period of validity for each application and the usage results for printing and scanning.

The power supply control system 316 performs the power supply control for the processing to transition into energy saving mode and to return to working mode from energy saving mode, taking into consideration the working state of each application after the startup of the image processing apparatus 103. In addition, when operating in energy saving mode, it is made so that power supply is not performed to the scanner unit 208, the printer unit 209, and the extended storage apparatus 213. In this manner, it is possible to curb energy consumption by narrowing down the electrical power to that necessary for working.

A system service 320 is a module for monitoring the working status of the image processing apparatus 103, and downloading software and licenses from a software distribution server via the network.

An application platform 330 is a middleware for making it possible to use the configurations of the operating system 300, and the controller platform 310 from a system library 340 and applications 350 that will be described below.

The system library 340 is a software module that provides the functions for the services that are usable by the applications 350. The system library 340 has an account management 341, a database management 342, and a network communication 343.

The account management 341 provides user account management functions for the image processing apparatus 103.

The database management 342 provides database management functions for the image processing apparatus 103.

The network communication 343 provides network communication functions for the image processing apparatus 103.

The applications 350 are software modules that provide the user with each type of function that is realized by the image processing apparatus 103 by being able to perform menu display to the operating unit 206, and to receive inputs from the user.

A verification application 351 is one of the applications 350, and uses the account management 341, which is a system library 340, and manages the users who can use the image processing apparatus 103.

A copy application 352 is one of the applications 350, and accesses the job/device control system 313, and provides a copy function for paper documents via the application platform 330.

A scan application 353 is one of the applications 350, and accesses the job/device control system, and provides an electronic data conversion function by scanning a paper document via the application platform 330.

A print application 354 is one of the applications 350, and holds print data for print jobs that have been received, and creates bibliographic information for managing the print data. The image processing apparatus 103 may also be made so as to receive settings as to whether or not to perform compulsory holding of print jobs. Note that until connection to the extended storage apparatus 213 is detected, print data and the bibliographic information for this print data are stored on the internal storage apparatus 204. After connection to the extended storage apparatus 213 is detected, the print data and the bibliographic information for this print data are stored on the extended storage apparatus 213. In addition, the print application 354 accesses the job/device control system 313 and provides an output execution function for print jobs for which a print command has been made via the application platform 330.

Figure 4:
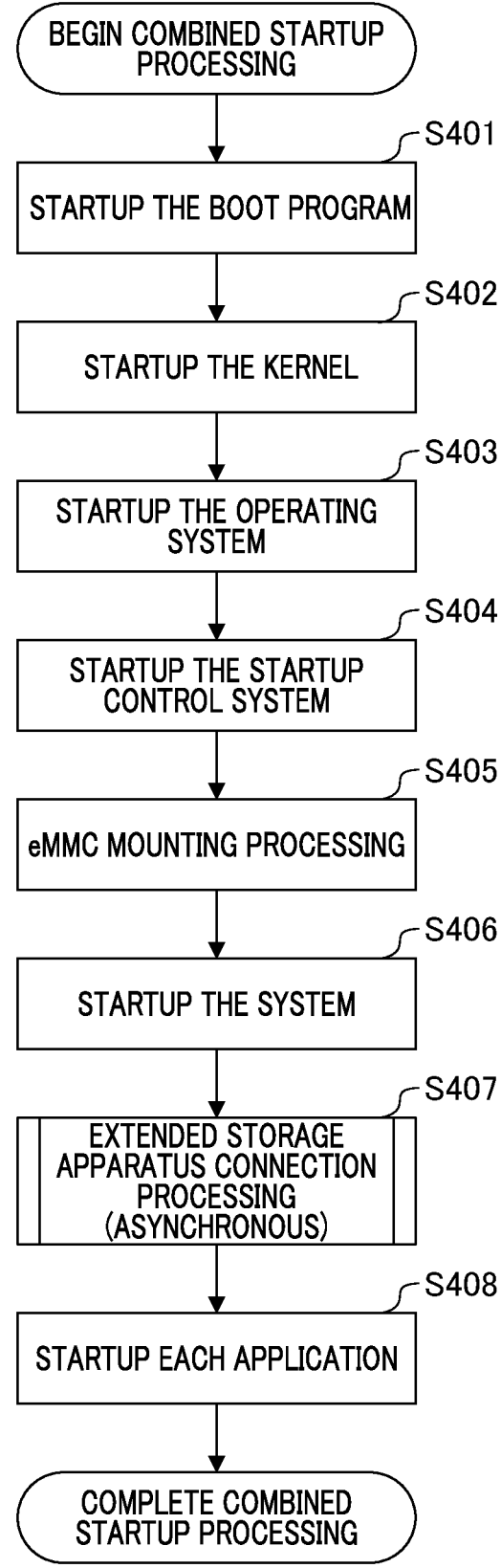
FIG. 4 is a flowchart showing one example of startup processing procedures for an image processing apparatus.

FIG. 4 is flowchart showing one example of the startup processing procedures for the image processing apparatus. During the processing in FIG. 4, a kernel that has been stored on a first partition of the internal storage apparatus 204 is started up from a boot program of a system that has been stored on the ROM 203. After this, mounting of the second partition and after of the internal storage apparatus 204, connection processing for the extended storage apparatus 213 that has been connected to the USB, and the startup of each type of application are performed.

During step S401, the CPU 201 starts up the boot program of the system that has been stored on the ROM 203 by reading it and decompressing it on the RAM 202, and the processing proceeds to step S402.

During step S402, the CPU 201 starts up the kernel that has been stored on the first partition of the internal storage apparatus 204 by decompressing it on the RAM 202, and the processing proceeds to step S403. The kernel thereby reads a driver with a function for each application to access and use the CPU 201 and RAM 202, the internal storage apparatus 204, and the extended storage apparatus 213, and assists the operation of the applications.

During step S403, the CPU 201 starts up the operating system 300 that has been stored on the first partition of the internal storage apparatus 204 by decompressing it on the RAM 202, and the processing proceeds to step S404.

During step S404, the operating system 300 starts up the startup control system 311 that has been stored on the first partition of the internal storage apparatus 204 by decompressing it on the RAM 202, and the processing proceeds to step S405. After this, the startup control system 311 that was started up in this context is executed by the CPU 201, and implements the startup processing.

During step S405, the startup control system 311 performs the mounting of the second partition and after of the internal storage apparatus 204, and the processing proceeds to step S406. It thereby becomes possible for each application to reference the regions of the second partition and after of the internal storage apparatus 204 via the file system. In addition, a "/PRINT" folder is provided as the region that the print application 354 is able to use. The print application 354 retains data in a region of the internal storage apparatus 204 by storing the received print jobs and the created bibliographic data in the "/PRINT" folder. During step S504 of FIG. 5, in a case in which the connection confirmation for the extended storage apparatus 213 times out, and it is determined that there is no extended storage apparatus 213, the "/PRINT" folder, which is a region of the internal storage apparatus 204, becomes the data storage region for the print application 354.

During step S406, the startup control system 311 starts up the system library (341, 342, and 343) that is stored on the internal storage apparatus 204, and the processing proceeds to step S407. It thereby becomes possible to reference the settings file and the like in the internal storage apparatus 204 when each application is started up.

During step S407, the startup control system 311 performs the connection processing for the extended storage apparatus 213, and the processing proceeds to step S408. The connection processing for the extended storage apparatus 213 will be explained below using FIG. 5. In addition, the connection processing for the extended storage apparatus 213 is executed asynchronously, and step S408 is processed before the connection processing for the extended storage apparatus 213 is completed. This is because it is not necessary to wait for the connection processing for the extended storage apparatus 213 for the startup of each of the applications (351, 352, 353, and 354), and it is preferable to more quickly provide the functions for each of the applications to the user.

During step S408, the startup control system 311 performs the startup of each of the applications (351, 352, 353, and 354). It thereby becomes possible to start up the print application 354 and to display the held print job list screen on the operating unit 206. In this context, in a case in which the extended storage apparatus 213 is not physically connected, it is possible to reference the "/PRINT" region of the internal storage apparatus 204 at the time of step S408, and the print data and bibliographic information can be stored there. However, in a case in which the extended storage apparatus is connected, the "/PRINT" region of the extended storage apparatus 213 cannot be referenced until the asynchronous processing for step S407 is completed, and therefore, it is necessary to wait until the asynchronous processing for step S407 is completed.

Figure 5:
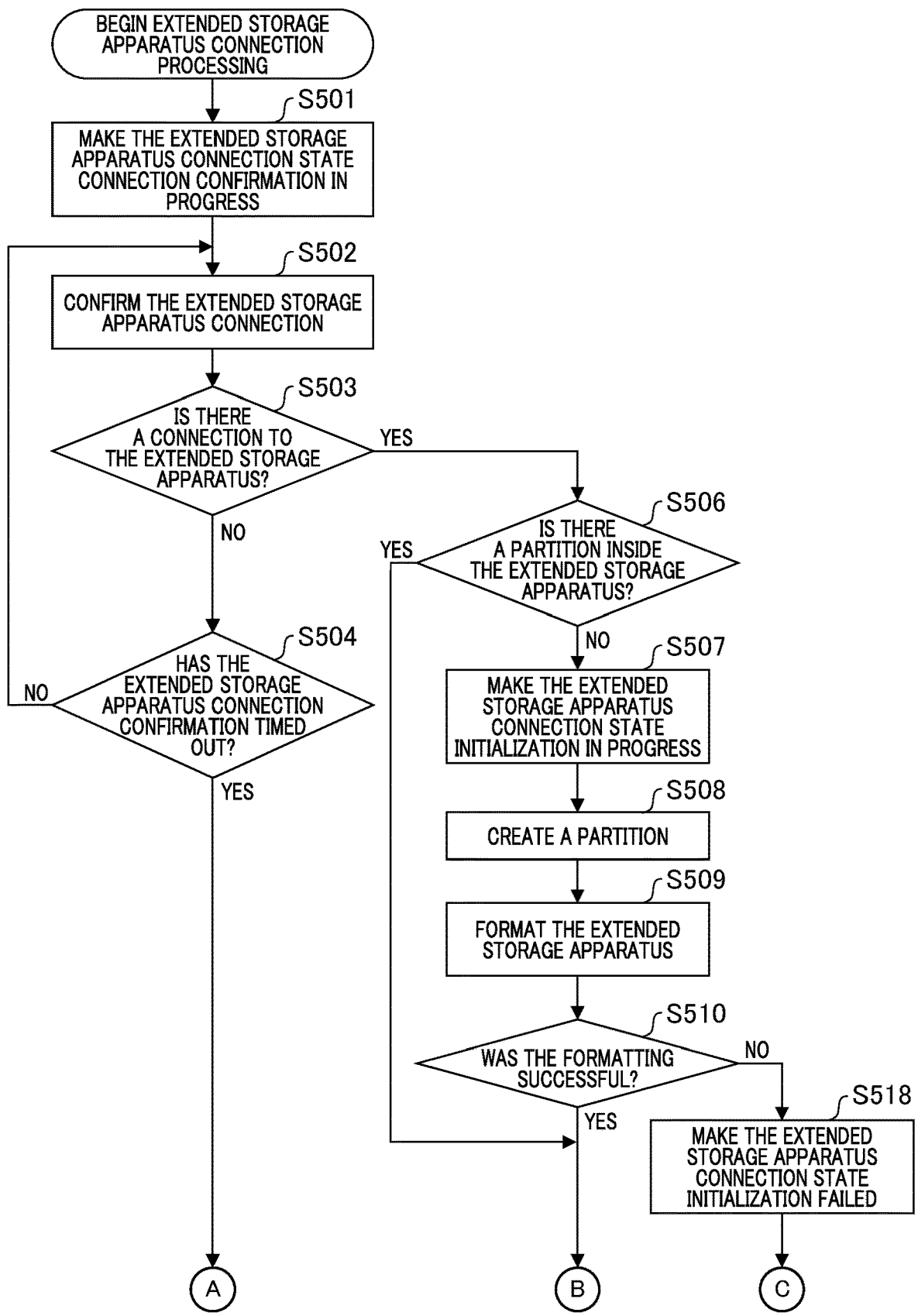
FIG. 5 is a flowchart showing one example of extended storage apparatus connection processing procedures for an image processing apparatus.
Figure 6:
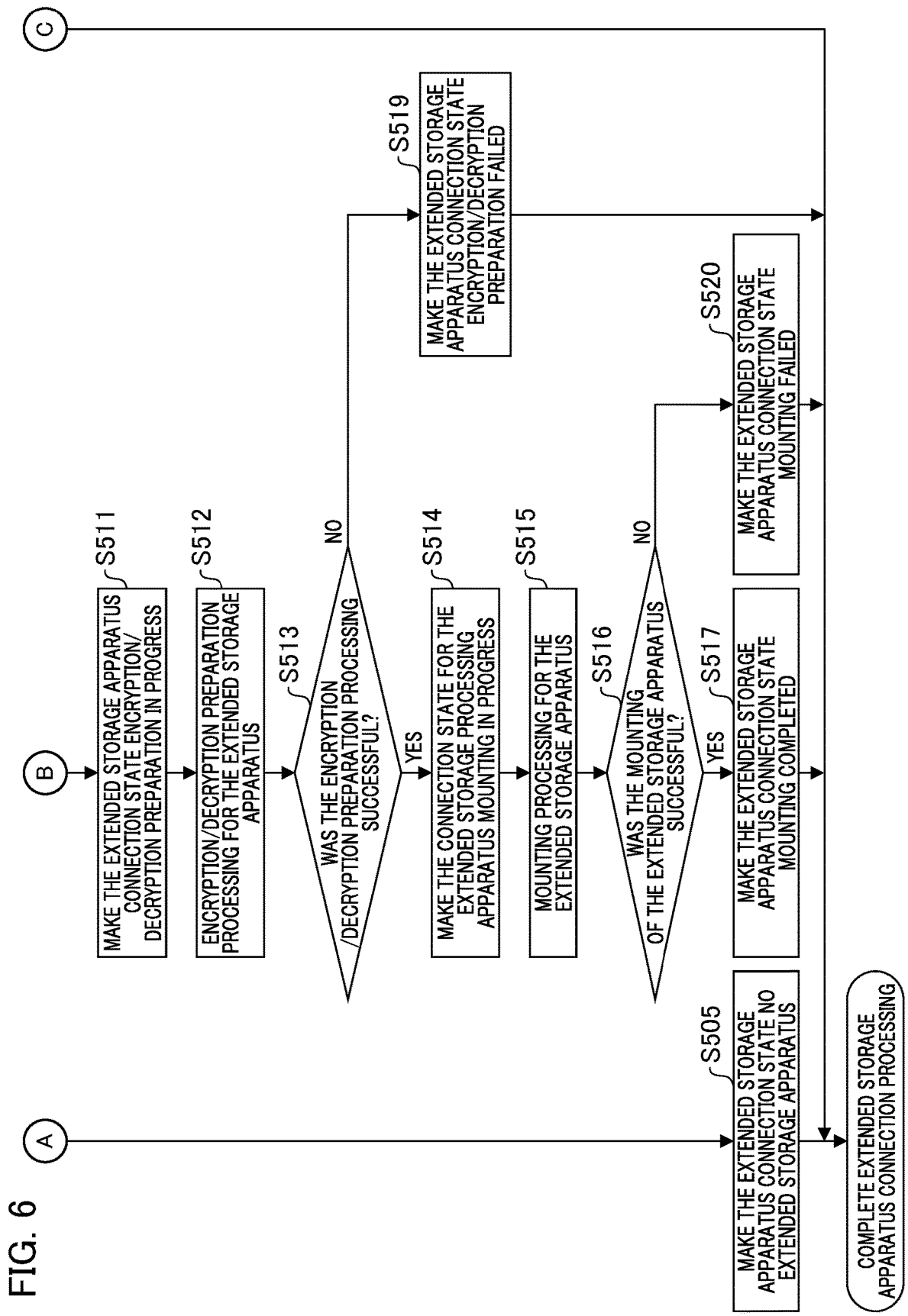
FIG. 6 is continuation of FIG. 5, and is a flowchart showing one example of extended storage apparatus connection processing procedures for an image processing apparatus.

FIG. 5 is a flowchart showing one example of extended storage apparatus connection processing procedures for the image processing apparatus. FIG. 6 is a continuation of FIG. 5, and is a flowchart showing one example of extended storage apparatus connection processing procedures for the image processing apparatus. FIG. 5 and FIG. 6 are diagrams showing the flow of the connection processing for the extended storage apparatus 213 during step S406 of FIG. 4.

During step S501, the startup control system 311 stores the connection state of the extended storage apparatus 213 on the RAM 202 as connection confirmation in progress, and the processing proceeds to step S502. In this context, the connection state of the extended storage apparatus 213 that has been stored on the RAM 202 is referenced during the held print job list display processing that is explained below in FIG. 8A, FIG. 8B, FIG. 14, FIG. 15, FIG. 17, and FIG. 18.

During step S502, the startup control system 311 confirms the connection state of the extended storage apparatus 213, and the processing proceeds to step S503. In this context, the VID (Vendor ID) and PID (Product ID) for the extended storage apparatus that are stored on the internal storage apparatus 204 in advance are used as the method for confirming the connection of the extended storage apparatus 213. The USB OF 212 confirms whether or not the VID and the PID for the recognized USB device match those that are stored on the internal storage apparatus 204.

During step S503, the startup control system 311 determines whether or not the extended storage apparatus 213 was connected during step S502. The startup control system 311 determines that the extended storage apparats 213 is connected in a case in which as a result of the confirmation in step S502, both the VIP and PID match the VIP and PID for the extended storage apparatus that are stored on the internal storage apparatus 204. In a case in which the extended storage apparatus 213 is connected, the startup control system 311 executes the processing for step S506. In a case in which the extended storage apparatus 213 is not connected, the startup control system 311 executes the processing for step S504.

During step S504, the startup control system 311 determines whether or not the connection confirmation time period for the extended storage apparatus 213 has exceeded a stipulated timeout time period. Note that the time period until a timeout is stored on the internal storage apparatus 204 in advance. In a case in which the timeout time period has been exceeded, the processing for step S505 is executed. In a case in which the timeout time period has not been exceeded, the processing for step S502 is executed.

During step S505, the startup control system 311 stores the connection state of the extended storage apparatus 213 on the RAM 202 as not connected, and the processing is completed.

During step S506, the startup control system 311 determines whether or not there is a partition in the extended storage apparatus 213. In a case in which there is a partition, the startup control system 311 executes the processing for step S511. In a case in which there is no partition, the startup control system 311 executes the processing for the step S507.

During step S507, the startup control system 311 stores the connection state for the extended storage apparatus 213 on the RAM 202 as initialization in progress, and the processing proceeds to step S508.

During step S508, the startup control system 311 creates a partition in the extended storage apparatus 213, and the processing proceeds to step S509.

During step S509, the startup control system 311 executes the formatting of the extended storage apparatus 213, and the processing proceeds to step S510.

During step S510, the startup control system 311 determines whether or not the formatting during step S509 was successful. In a case in which the formatting was successful, the startup control system 311 executes the processing for step S511. In a case in which the formatting failed, the startup control system 311 executes the processing for step S518.

During step S511, the startup control system 311 stores the connection state of the extended storage apparatus 213 on the RAM 202 as encryption/decryption preparation in progress.

During step S512, the startup control system 311 sets the encryption key that is stored on the security chip 214 in the encryption/decryption system, and the processing proceeds to step S513 so that the extended storage apparatus 213 can be encrypted/decrypted.

During step S513, the startup control system 311 determines whether or not the encryption/decryption preparation processing from step S512 was successful. In a case in which the encryption/decryption preparation processing was successful, the startup control system 311 executes the processing for step S514. In a case in which the encryption/ decryption processing failed, the startup control system 311 executes the processing for step S519.

During step S514, the startup control system 311 stores the connection state of the extended storage apparatus 213 on the RAM 202 as mounting in progress, and the processing proceeds to step S515.

During step S515, the startup control system 311 executes the processing for mounting the extended storage apparatus 213 on the "/PRINT" folder, and the processing proceeds to step S516. The "/PRINT" folder becomes the storage region for the extended storage apparatus 213 by the mounting processing being completed without any errors. In addition, the internal storage apparatus 204 is thereby unmounted from the "/PRINT" folder, and upon the "/PRINT" folder being referenced, it is the extended storage apparatus 213, not the internal storage apparatus 204, that is accessed. Therefore, it becomes such that the received print data and created bibliographic information are stored on the extended storage apparatus 213.

During step S516, the startup control system 311 determines whether or not the mounting processing from step S525 was successful. In a case in which the mounting processing was successful, the startup control system 311 executes the processing for step S517. In a case in which the mounting processing failed, the startup control system 311 executes the processing for step S520.

During step S517, the startup control system 311 stores the connection state of the extended storage apparatus 213 on the RAM 202 as mounting completed, and the processing is completed.

During step S518, the startup control system 311 stores the connection state for the extended storage apparatus 213 on the RAM 202 as initialization failed, and the processing is completed.

During step S519, the startup control system 311 stores the connection state for the extended storage apparatus 213 on the RAM 202 as encryption/decryption preparation failed, and the processing is completed.

During step S520, the startup control system 311 stores the connection state for the extended storage apparatus 213 on the RAM 202 as mounting failed, and the processing is completed.

The connection state of the extended storage apparatus 213 is stored on the RAM 202 by the above-described processing. It is thereby possible for each application to confirm up to which stage the connection processing for the extended storage apparatus 213 has progressed by referencing the connection state of the extended storage apparatus 213 that has been stored on the RAM 202.

Figures 7A, 7B:
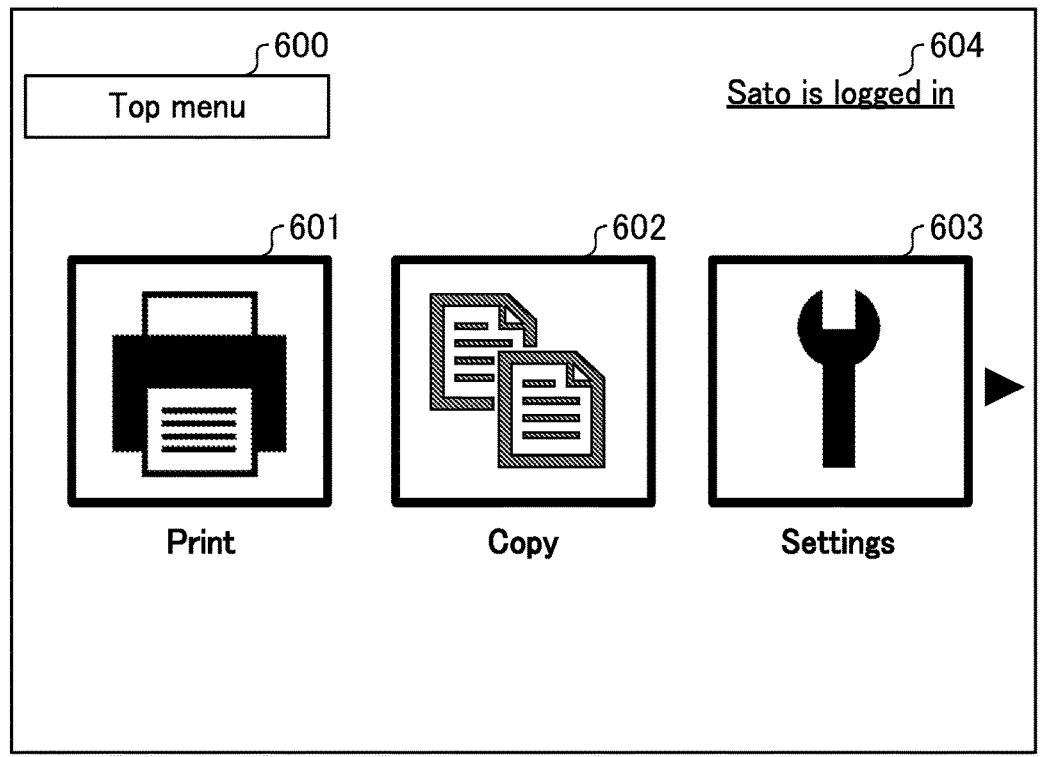
FIG. 7A and FIG. 7B are one example of a top menu screen and a held print job list screen that are displayed by an operating unit of an image processing apparatus.

FIG. 7A and FIG. 7B are one example of a top menu screen and a held print job list screen that are displayed on the operating unit 206 of the image processing apparatus 103. FIG. 7A is one example of a top menu screen.

When a user logs onto the image processing apparatus 103 using an IC card or the like, the top menu 600 is displayed after they login, and it becomes possible for the user to select the application that will be used on the image processing apparatus 103 from this top menu 600. FIG. 7A shows a state in which the user has logged into the image processing apparatus 103, and therefore, a logged in user 604 is displayed on the screen. FIG. 7A shows an example of a screen displayed when logged in with the user name "Sato".

The applications 350 that are loaded onto the image processing apparatus 103 are displayed on the top menu 600 using icons. A print icon 601 is the icon for the print application 354, and if it is pressed, the print application 354 is started up. A copy icon 602 is the icon for the copy application 352, and if it is pressed, the copy application 352 is started up. A settings icon 603 is for one of the applications 350, and is an icon for an application that performs settings relating to the image processing apparatus 103.

FIG. 7B is one example of a held print job list screen. This held print job list screen is a screen that is displayed on the operating unit 206 by the print application 354 that is executed in the CPU 201 of the image processing apparatus 103. A list of the print jobs that belong to a verified user is displayed on the held print job list screen.

FIG. 7B is a held print job list screen 610 of the print application 354 that is displayed by the print icon 601 from FIG. 7A being pressed down. FIG. 7B shows an example of a screen displayed when logged in with the user name "Sato".

The held print job list screen 610 from FIG. 7B displays a job name 611, a color/monochrome setting 612, a paper size 613, and a number of copies 614 for each print job. The print jobs that are operable on this screen are the two print jobs 615, and 616.

The print application 354 acquires the bibliographic information for the user "Sato" who is currently logged in from the "/PRINT" folder, and displays this on the held print job list screen 610. The held print job list screen 610 displays a print button 618, a delete button 619, and a print settings button 620. The operations for the target print job are performed by a user selecting their desired print job from among the displayed print jobs, and thereafter pressing one from among the print button 618, the delete button 619, or the print settings button 620.

A logged in user 622 shows the user who is logged in. Upon an update button 621 being pressed down, the print application 354 of the image processing apparatus 103 re-acquires the bibliographic information for the user "Sato", who is the logged in user, from the "/PRINT" folder, and updates the print job list based on the acquired bibliographic information.

Figure 8A:
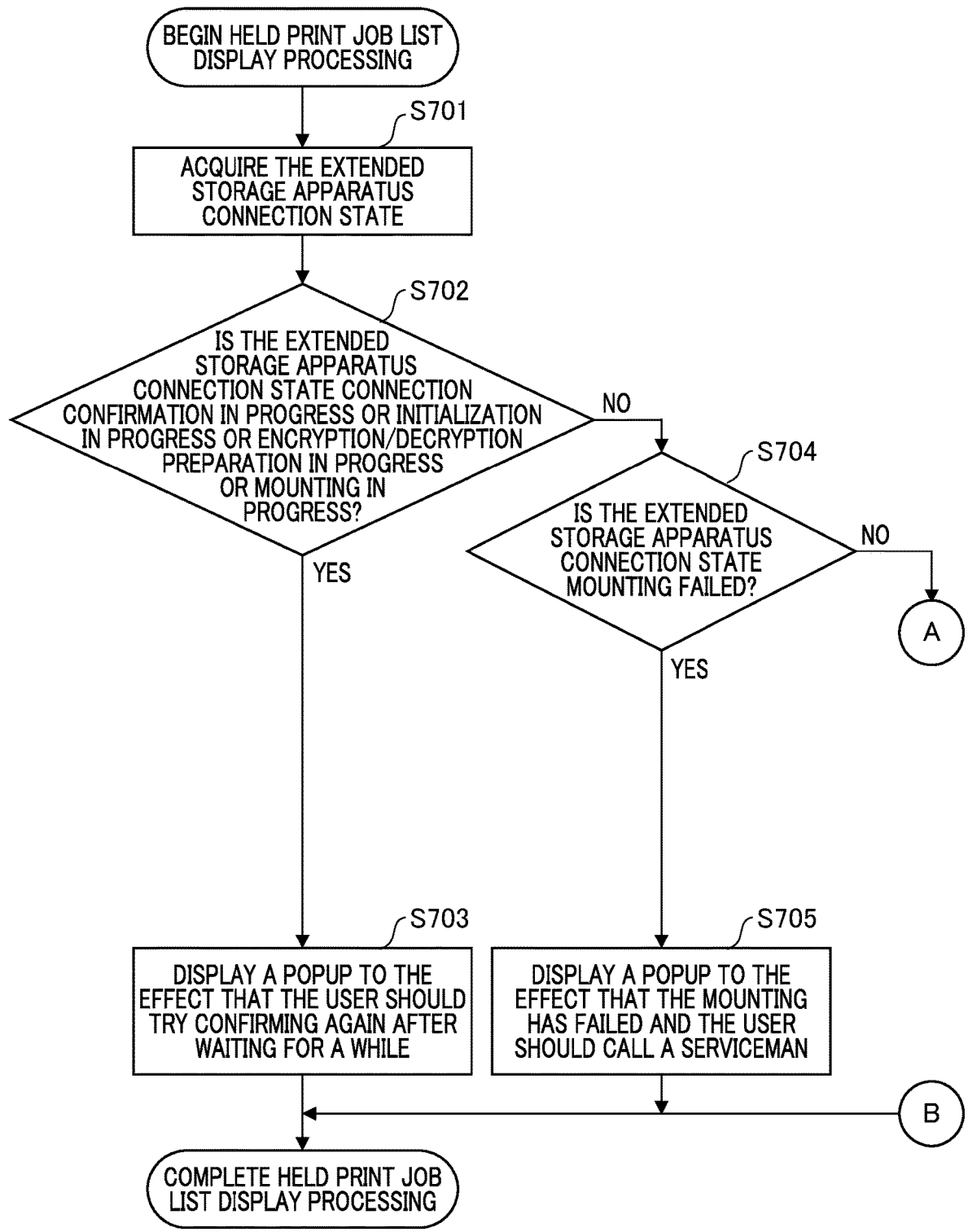

FIG. 8A and FIG. 8B are a flowchart showing one example of held print job list screen display processing procedures for the image processing apparatus 103. FIG. 8A and FIG. 8B are a diagram showing the flow of the processing in which the print application 354 displays the screen from FIG. 7B.

During step S701, the print application 354 acquires the connection state of the extended storage apparatus 213 that is stored on the RAM 202, and the processing proceeds to step S702.

During step S702, the print application 354 determines whether or not the connection state for the extended storage apparatus 213 that was acquired during step S701 is connection confirmation in progress, initialization in progress, encryption/decryption preparation in progress, or mounting in progress. In a case in which the connection state for the extended storage apparatus 213 is any of these states, the print application 354 executes the processing for step S703. In a case in which the connection state of the extended storage apparatus 213 is not any of these states, the print application 354 executes the processing for step S704.

During step S703, the print application 354 displays a pop-up on which contents are recorded that communicate the response that the extended storage apparatus 213 is currently being prepared for use, and therefore please reopen the screen after waiting for a while to the user, and the processing is completed. The details of the popup that is displayed in this context will be explained using FIG. 9A.

During step S704, the print application 354 determines whether or not the connection state for the extended storage apparatus 213 that has been acquired during step S701 is mounting failed. In a case in which the connection state is mounting failed, the print application 354 executes the processing for step S705. In a case in which the connection state is not mounting failed, the print application 354 executes the processing for step S706.

During step S705, the print application 354 displays a pop up on which contents have been recorded that communicate to the user the response that the mounting for the extended storage apparatus 213 has failed, please contact a manager, and the processing is completed. The details of the popup that is displayed in this context will be explained using FIG. 9B.

During step S706, the print application 354 determines whether or not the connection state for the extended storage apparatus 213 that was acquired during step S701 is encryption/decryption preparation failed. In a case in which the connection state is encryption/decryption preparation failed, the print application 354 executes the processing for step S707. In a case in which the connection state is not encryption/decryption preparation failed, the print application 354 executes the processing for step S708.

During step S707, the print application 354 displays a popup on which contents have been recorded that communicate to the user the response that the encryption/decryption preparation for the extended storage apparatus 213 has failed, please contact a manager, and the processing is completed. The details of the popup that is displayed in this context will be explained using FIG. 10A.

During step S708, the print application 354 determines whether or not the connection state for the extended storage apparatus 213 that was acquired during step S701 is initialization failed. In a case in which the connection state is initialization failed, the print application 354 executes the processing for step S709. In a case in which the connection state is not initialization failed, the print application 354 executes the processing for step S710.

During step S709, the print application 354 displays a popup on which contents have been recorded that communicate to the user the response that the initialization of the extended storage apparatus 213 has failed, and to contact a manager, and the processing is completed. The details of the popup that is displayed in this context will be explained using FIG. 10B.

During step S710, the print application 354 acquires the bibliographic information from the "/PRINT" folder, and displays the held print job list screen from FIG. 7B. In this context, in a case in which the connection state for the extended storage apparatus 213 is no extended storage apparatus, the "/PRINT" folder is the storage region for the internal storage apparatus 204. In a case in which the connection state for the extended storage apparatus 213 is mounting completed, the "/PRINT" folder is the storage region for the extended storage apparatus 213. Note that the copy application 352 and the scan application 353 do not use the extended storage apparatus 213 region, and therefore there are no cases in which they display popups such as those that have been explained in this context.

Figure 9A:
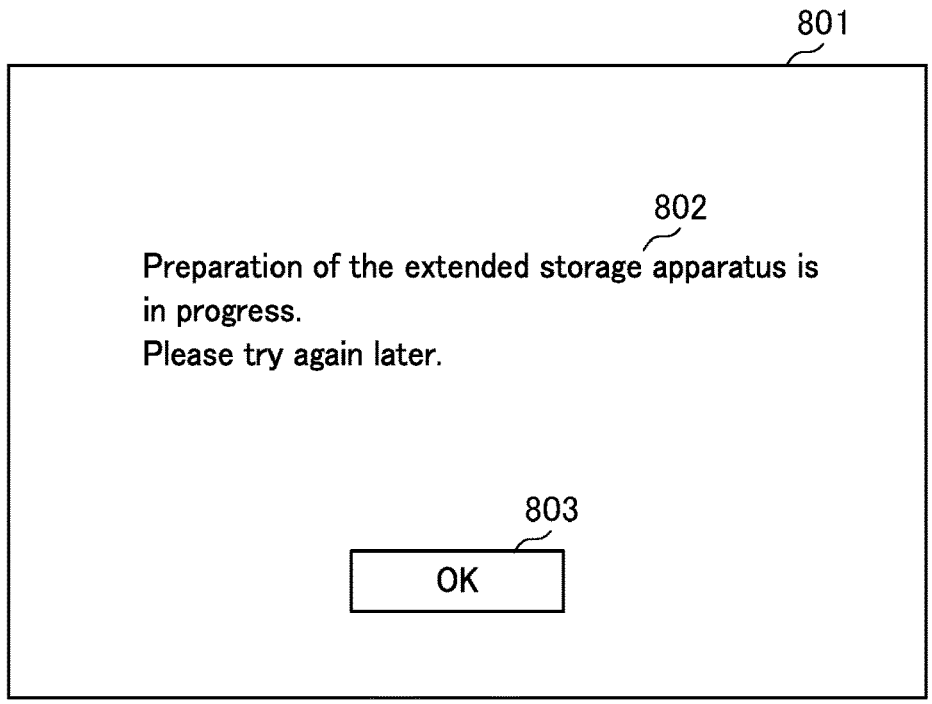
FIG. 9A and FIG. 9B are one example of a pop-up screen according to the connection state of an extended storage apparatus that is displayed on an operating unit by a print application of an image processing apparatus.

The popup screen 801 that is shown in FIG. 9A is one example of an extended storage apparatus connection preparation in progress popup screen in the image processing apparatus 103. This screen is a screen that is displayed on the operating unit 206 by the print application 354 that is executed in the CPU 201 of the image processing apparatus 103.

A display area 802 records a message to the effect that connection preparation for the extended storage apparatus 213 is in progress, and to please re-open the screen after waiting for a while. Upon detecting that an OK button 803 has been pressed by the user, the print application 354 displays the top menu 600. The popup screen 801 of FIG. 9A is one example of a display to the effect that the held print job list that has been stored on the extended storage apparatus 213 cannot be displayed. The popup screen 801 from FIG. 9A is one example of a display to the effect that preparation for the extended storage apparatus 213 is in progress.

Figure 9B:
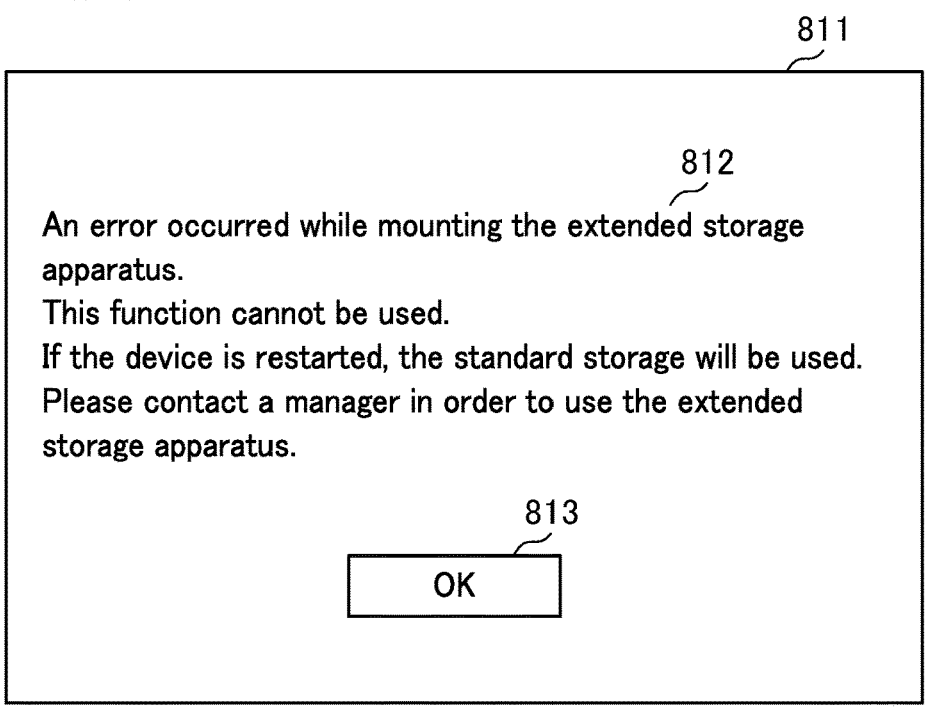

The popup screen 811 shown in FIG. 9B is one example of an extended storage apparatus mounting error popup screen in the image processing apparatus 103. This screen is a screen that is displayed on the operating unit 206 by the print application 354 that is executed in the CPU 201 of the image processing apparatus 103.

The display area 812 records a message to the effect the mounting of the extended storage apparatus 213 has failed and therefore please contact a manager. Upon detecting that an OK button 813 has been pressed, the print application 354 displays the top menu 600. The popup screen 811 of FIG. 9B is one example of a display to the effect that the held print job list that has been stored on the extended storage apparatus 213 cannot be displayed. The popup screen 811 from FIG. 9B is one example of a display to the effect that there is an error hindering the use of the extended storage apparatus 213.

Figure 10A:
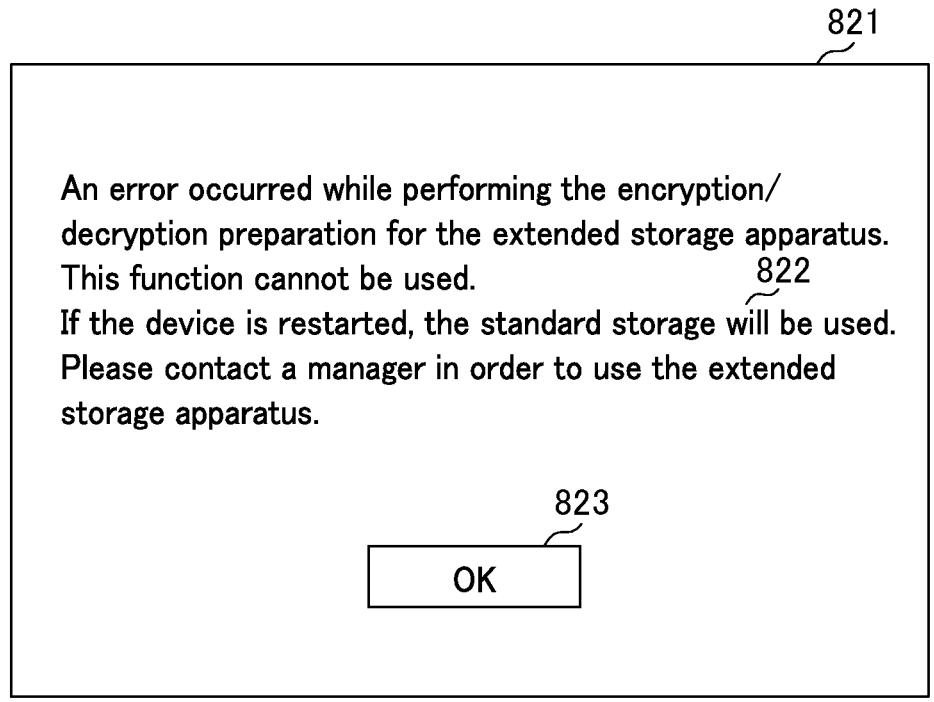
FIG. 10A and FIG. 10B are on example of a pop-up screen according to a connection state of an extended storage apparatus that is displayed on an operating unit by a print application of an image processing apparatus.

A popup screen 821 that is shown in FIG. 10A is one example of an extended storage apparatus encryption/decryption preparation error popup screen in the image processing apparatus 103. This screen is a screen that is displayed on the operating unit 206 by the print application 354 that is executed in the CPU 201 of the image processing apparatus 103.

The display area 822 records a message to the effect that the encryption/decryption preparation for the extended storage apparatus 213 has failed, and therefore please contact a manager. Upon detecting that an OK button 823 has been pressed by a user, the print application 354 displays the top menu 600. The popup screen 821 of the FIG. 10A is one example of a display to the effect that the held print job list that has been stored on the extended storage apparatus 213 cannot be displayed. The popup screen 812 from FIG. 10A is one example of a display to the effect that there is an error hindering the use of the extend storage apparatus 213.

Figure 10B:
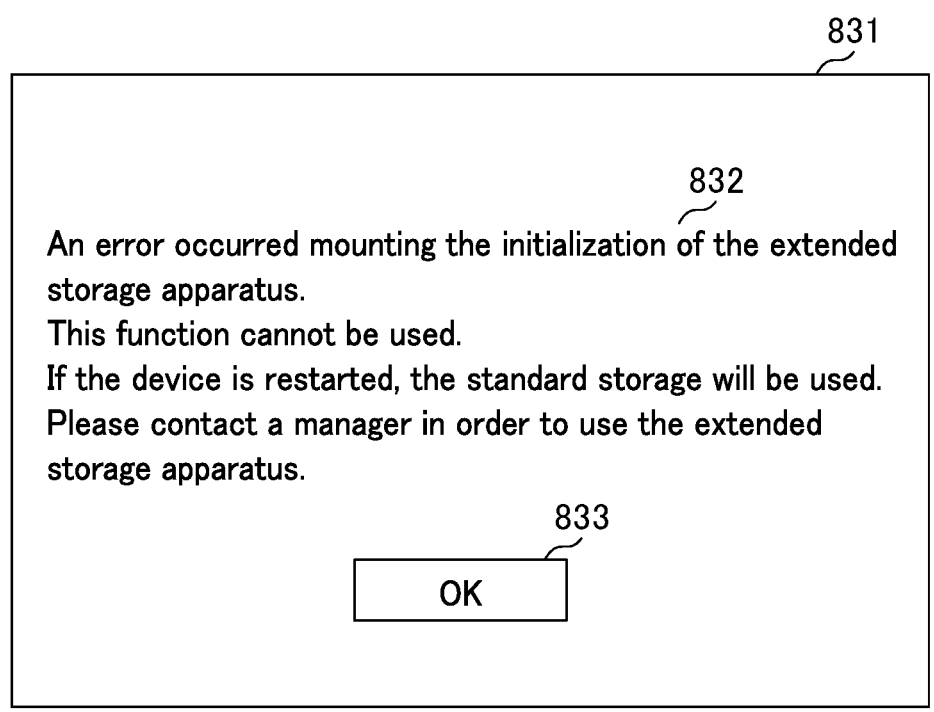

A popup menu 831 that is shown in FIG. 10B is one example of an extended storage apparatus initialization error popup screen in the image processing apparatus 103. This screen is a screen that is displayed on the operating unit 206 by the print application 354 that is executed in the CPU 201 of the image processing apparatus 103.

The display area 832 records a message to the effect that initialization of the extended storage apparatus 213 has failed, and therefore please contact a manger. Upon detecting that an OK button 833 has been pressed by the user, the print application 354 displays the top menu 600. The popup screen 831 from FIG. 10B is one example of a display to the effect that the held print job list that has been stored on the extended storage apparatus 213 cannot be displayed. The popup screen 831 of FIG. 10B is one example of a display to the effect that there is an error hindering the use of the extended storage apparatus 213.

As has been described above, according to the First Embodiment, when a user attempts to display the held print job list screen 610 immediately after starting up the image processing apparatus 103, the popup screens 801, 811, 821, and 831 are displayed according to the state of the extended storage apparatus 213. It is thereby possible to notify the user of whether or not the image processing apparatus 103 is in a state in which the held print job list screen 610 can be properly displayed, and the usability is increased.

Second Embodiment

In the First Embodiment, an explanation was given up until the completion of the mounting of the extended storage apparatus 213 when starting up the image processing apparatus 103. However, when the image processing apparatus 103 has entered energy saving mode as well, power is no longer supplied to the extended storage apparatus 213. Therefore, in a case in which the image processing apparatus 103 is returned from energy saving mode, and is transitioned into working mode it is also necessary to display the held print job list screen by referencing the connection state of the extended storage apparatus 213. In the Second Embodiment, processing that can also respond to this will be executed.

Figure 12:
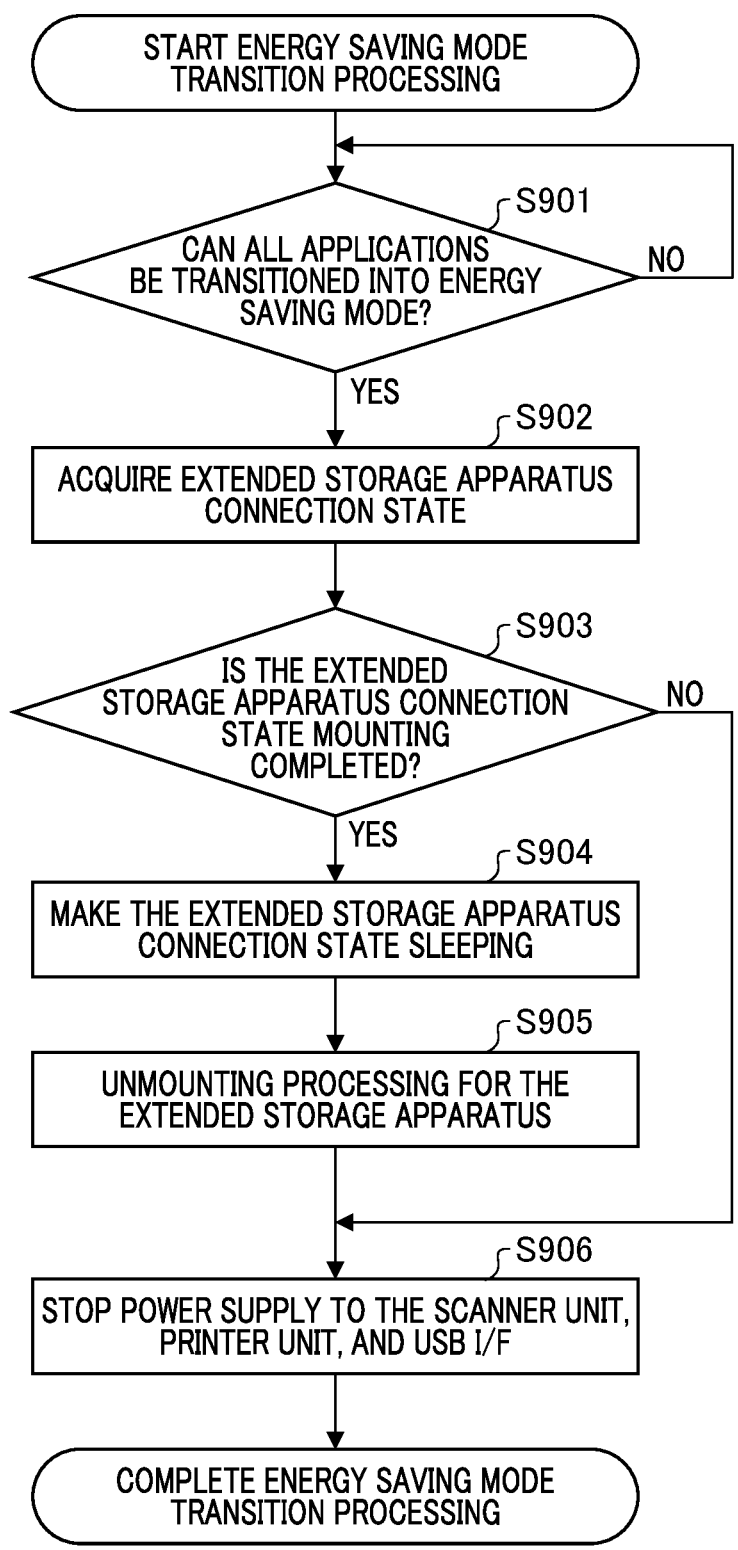
FIG. 12 is a flowchart showing one example of energy saving mode transition processing procedures for an image processing apparatus.

FIG. 12 is a flowchart for the processing for when the image processing apparatus 103 transitions from working mode into sleep mode. Note that the trigger for entering the processing in FIG. 12 is made the timing at which 10 seconds have passed without a user input to the operating unit 206 while in working mode.

During step S901, the power supply control system 316 confirms if each of the applications 350 can be transitioned into energy saving mode. In a case in which all of the applications can be transitioned into energy saving mode, the power supply control system 316 executes the processing for step S902. In case in which all of the applications cannot be transitioned into energy saving mode, the power supply control system 316 executes the processing for step S901.

During step S902, the power supply control system 316 acquires the connection state of the extended storage apparatus 213 from the RAM 202, and the processing proceeds to step S903.

During step S903, the power supply control system 316 confirms whether or not the connection state for the extended storage apparatus 213 is mounting completed. In a case in which the connection state for the extended storage apparatus is mounting completed, the power supply control system 316 executes the processing for step S904. In a case in which the connection state for the extended storage apparatus 213 is not mounting completed, the power supply control system 316 executes the processing for step S906.

During step S904, the power supply control system stores the connection state for the extended storage apparatus 213 on the RAM 202 as sleeping, and the processing proceeds to step S905.

During step S905, the power supply control system 316 executes processing to unmount the extended storage apparatus 213 from the "/PRINT" folder, and the processing proceeds to step S906. The "/PRINT" folder is thereby no longer the storage region for the extended storage apparatus 213.

During step S906, the power supply control system 316 stops the supply of power to the scanner unit 208, the printer unit 209, and the USB OF 212.

Figure 13:
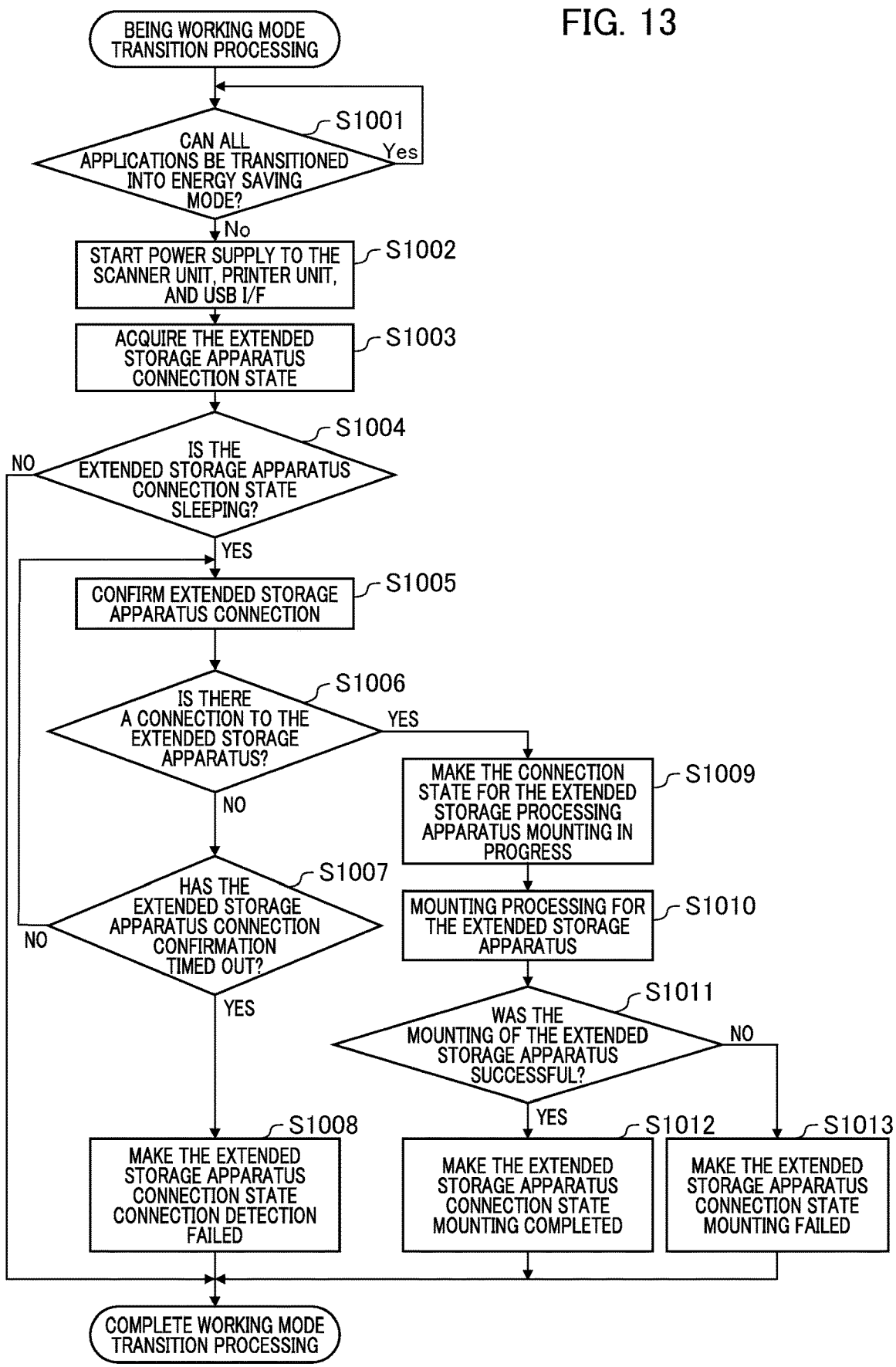
FIG. 13 is a flowchart showing one example of working mode transition processing procedures for an image processing apparatus.

FIG. 13 is a flowchart for the processing for transitioning from energy saving mode to working mode. Note that the trigger for entering the processing in FIG. 13 is the timing at which the image processing apparatus 103 has transitioned to energy saving mode.

During step S1001, the energy supply control system 316 confirms if it is possible for each of the applications 350 to transition into energy saving mode. In a case in which any of the applications cannot be transitioned into energy saving mode, the energy source control system 316 executes the processing for step S1002. In a case in which all of the applications can be transitioned into energy saving mode, the power supply control system 316 executes the processing for step S1001. Energy saving mode is thereby avoided in cases in which it is necessary for even one application to be in working mode.

During step S1002, the power supply control system 316 starts the power supply to the scanner unit 208, the printer unit 209, and the USB OF 212.

During step S1003, the power supply control system 316 acquires the connection state for the extended storage apparatus 213 from the RAM 202, and the processing proceeds to step S1004.

During step S1004, the power supply control system 316 confirms whether or not the connection state for the extended storage apparatus 213 is sleeping. In a case in which the connection state for the extended storage apparatus 213 is sleeping, the power supply control system 316 executes the processing for step S1005. In a case in which the connection state for the extended storage apparatus 213 is not sleeping, the power supply control system 316 completes the processing. Processing related to the connection of the extended storage apparatus 213 is thereby not performed after step S1005 in cases such as when the extended storage apparatus 213 is not connected.

During step S1005, the power supply control system 316 confirms the connection state of the extended storage apparatus 213, and the processing proceeds to step S1006. In this context, the VID (Vendor ID), and PID (product ID) for the extended storage apparatus 213 that are stored on the internal storage apparatus 204 in advance are used as the method for confirming the connection state of the extended storage apparatus 213. The power supply control system 316 confirms whether or not the VID and PID of the USB device that has been recognized by the USB OF 212 match those that are stored on the internal storage apparatus 204.

During step S1006, the power supply control system 316 determines whether or not the extended storage apparatus 213 was connected during step S1005. In a case in which both the VIP and PID match the VIP and the PID for the extended storage apparatus 213 that are stored on the internal storage apparatus 204, the power supply control system 316 determines that the extended storage apparatus 213 is connected, and the processing for step S1009 is executed. In a case in which even one of the VIP and the PID do not match the VIP and the PID for the extended storage apparatus 213 that are stored on the internal storage apparatus 204, the power supply control system 316 determining that the extended storage apparatus 213 is not connected, and the processing for step S1007 is executed.

During step S1007, the power supply control system 316 determines whether or not the connection confirmation time period for the extended storage apparatus 213 has surpassed the stipulated timeout time period. Note that it is assumed that the time period until a timeout is stored on the internal storage apparatus 204 in advance. In a case in which the connection confirmation period has surpassed the timeout time period, the power supply control system 316 executes the processing for step S1008. In a case in which the connection confirmation time period has not surpassed the timeout time period, the power supply control system 316 executes the processing for step S1005.

During step S1008, the power supply system 316 stores the connection state for the extended storage apparatus 213 on the RAM 202 as connection detection failed, and the processing is completed.

During step S1009, the power supply control system 316 stores the connection state for the extended storage apparatus 213 on the RAM 202 as mounting in progress, and the processing proceeds to step S1010.

During step S1010, the power supply control system 316 executes processing to mount the extended storage apparatus 213 to the "/PRINT" folder, and the processing proceeds to step S1011. The "/PRINT" folder becomes the storage region for the extended storage apparatus 213 by the mounting processing being completed without any errors.

During step S1011, the power supply control system 316 determines whether or not the mounting processing during step S1010 was successful. In a case in which the mounting processing was successful, the power supply control system 316 executes the processing for step S1012. In a case in which the mounting processing was not successful, the power supply control system 316 executes the processing for step S1013.

During step S1012, the power supply control system 316 stores the connection state for the extended storage apparatus 213 on the RAM 202 as mounting completed, and the processing is completed.

During step S1013, the power supply control system 316 stores the connection state for the extended storage apparatus 213 on the RAM 202 as mounting failed, and the processing is completed.

Figure 14:
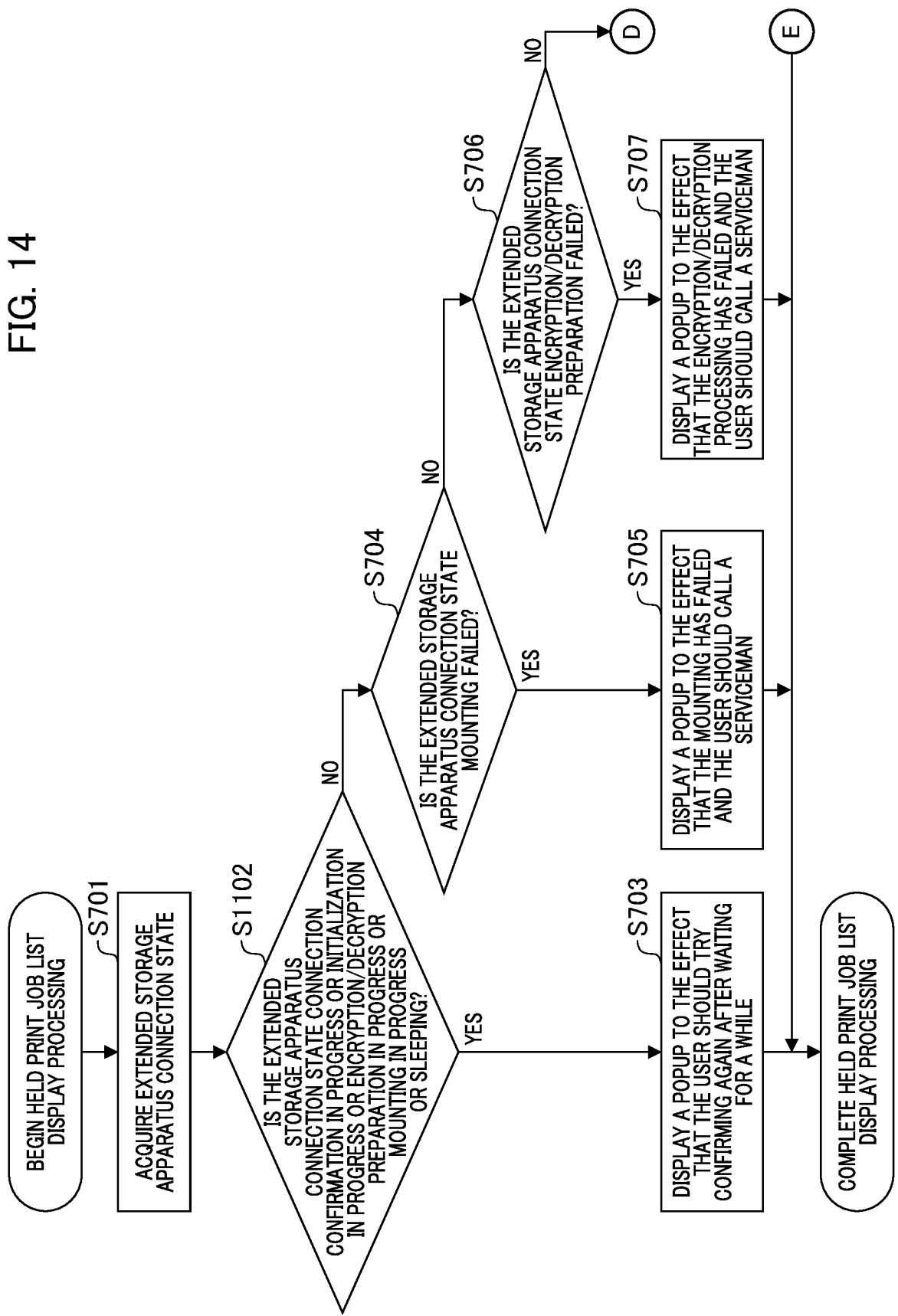
FIG. 14 is a flowchart showing one example of held print job list screen display processing procedures for an image processing apparatus.
Figure 15:
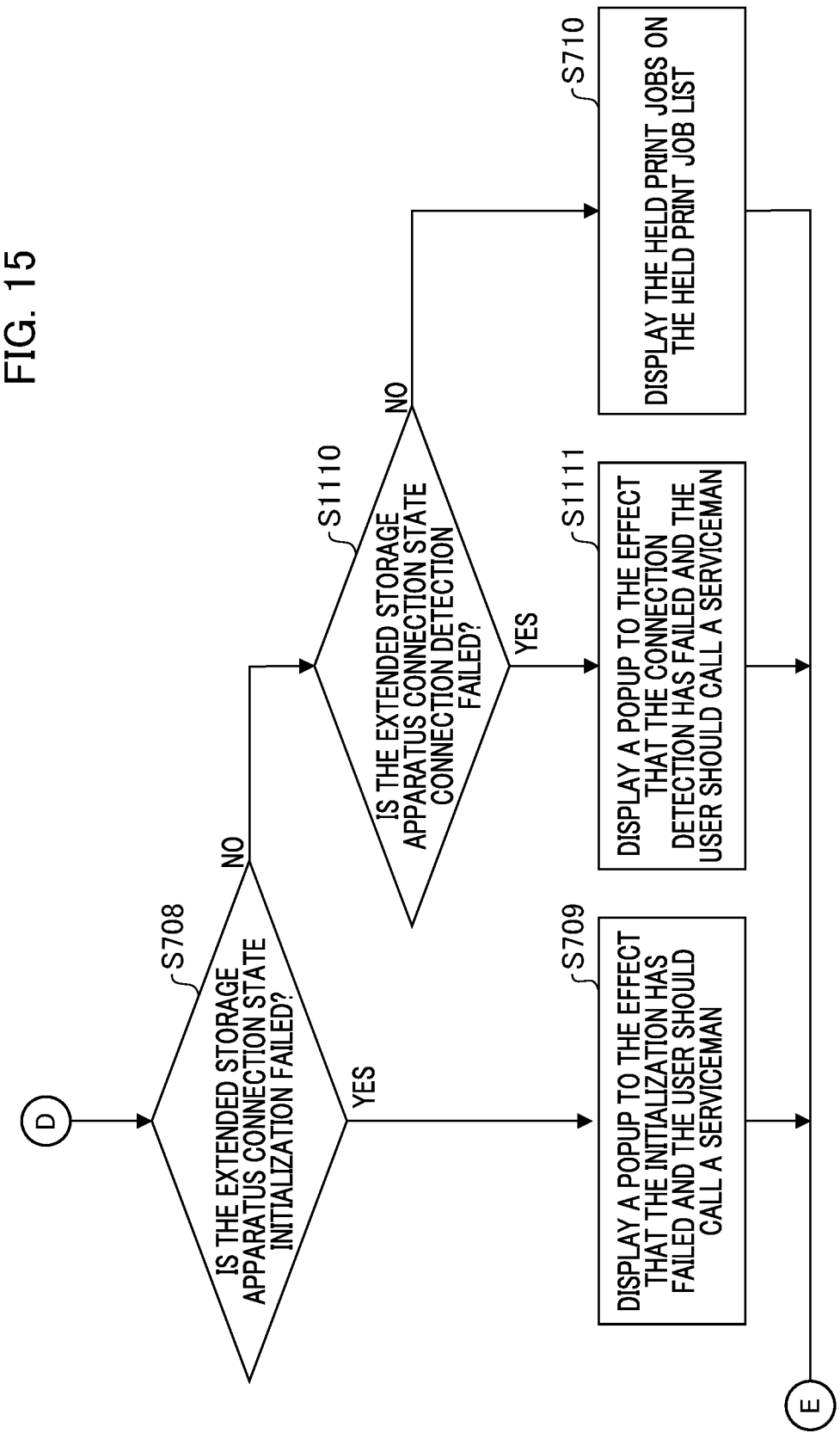
FIG. 15 is a continuation of FIG. 14, and is a flowchart showing one example of held print job list screen display processing procedures for an image processing apparatus.

FIG. 14 is a flowchart showing one example for the image processing apparatus. FIG. 15 is a continuation of FIG. 14, and is a flowchart showing one example of held print job list screen display processing procedures for the image processing apparatus. FIG. 14 and FIG. 15 are diagrams showing the flow of the processing for when the print application 354 displays the screen from FIG. 7B. The processing in FIG. 14, and FIG. 15 is processing in which a portion of the branching conditions have been changed from the processing in FIG. 8A and FIG. 8B. The processing in FIG. 14 and FIG. 15 that is the same as the processing in FIG. 8A and FIG. 8B have been given the same reference numerals.

In FIG. 14 and FIG. 15, the processing for the steps other than step S1102, step S1110, and step S1111 is not different from the processing in FIG. 8A and FIG. 8B, and therefore, an explanation thereof will be omitted in this Embodiment.

During step S701, the print application 354 acquires the connection state for the extended storage apparatus 213 that is stored on the RAM 202, and the processing proceeds to step S1102.

During step S1102, the print application 324 determines whether or not the connection state for the extended storage apparatus 213 that has been acquired during step S701 is connection confirmation in progress, initialization in progress, encryption/decryption preparation in progress, mounting in progress, or sleeping. In a case in which the connection state for the extended storage apparatus 213 is any one of these states, the print application 354 executes the processing for step S703. In a case in which the connection state for the extended storage apparatus 213 is not any of these states, the print application 354 executes the processing for step S704. In the present embodiment, during step S703, in a case in which the connection state for the extended storage apparatus 213 is sleeping, the print application 354 is also able to display the popup screen 801 from FIG. 9A.

During step S708, the print application 354 determines whether or not the connection state for the extended storage apparatus 213 that was acquired during step S701 is initialization failed. In a case in which the connection state is connection failed, the print application 354 executes the processing for step S709. In a case in which the connection state is not initialization failed, the print application 354 executes the processing for step S1110.

During step S1110, the print application 324 determines whether or not the connection state for the extended storage apparatus that 213 was acquired during step S701 is connection detection failed. In a case in which the connection state is connection detection failed, the print application 354 executes the processing for step S1111. In a case in which the connection state is not connection detection failed, the print application 354 executes the processing for step S710.

Figure 11A:
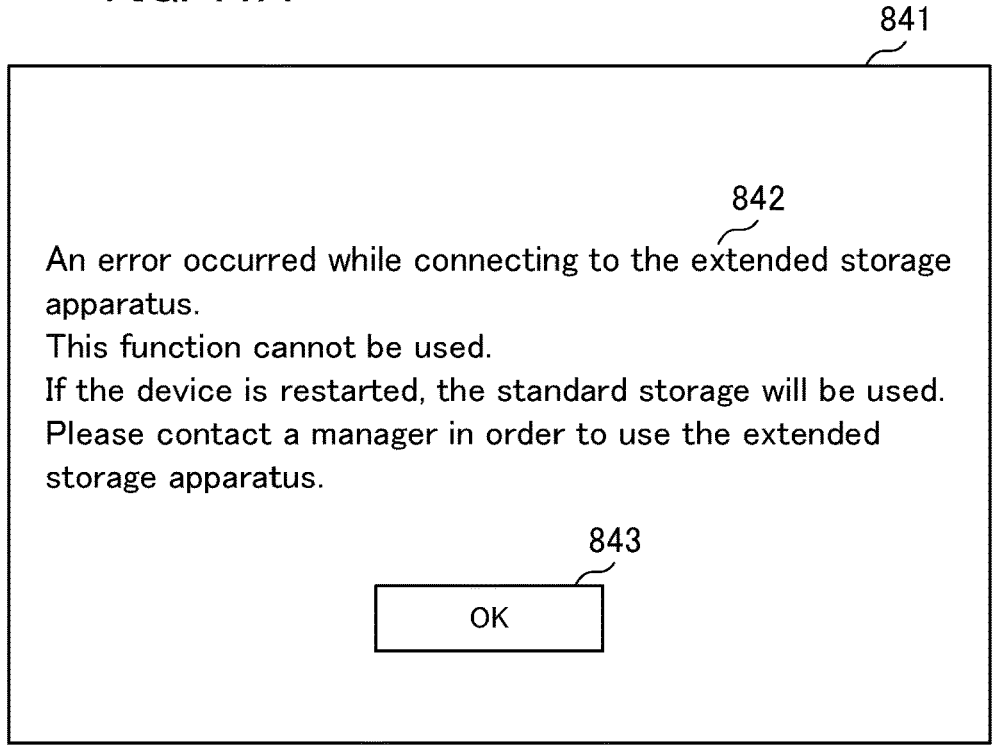
FIG. 11A and FIG. 11B are one example of a pop-up screen according to the connection state of an extended storage apparatus that is displayed on an operating unit by a print application of an image processing apparatus.

During step S1111, the print application 354 displays a pop-up on which contents are recorded that communicate the response that the connection detection for the extended storage apparatus 213 has failed, and therefore please contact a manager, and the processing is completed. Note that during step S1111, the print application 354 displays the popup screen 841 that is shown in FIG. 11A. This screen is a screen that is displayed on the operating unit 206 by the print application 354 that is executed in the CPU 201 of the image processing apparatus 103.

A display area 842 records a message to the effect that the connection detection for the extended storage apparatus 213 has failed, and therefore please contact a manager. Upon detecting that an OK button 834 has been pressed by the user, the print application 354 displays the top menu 600. A popup screen 841 from FIG. 11A is one example of a display to the effect that the held print job list that has been stored on the extended storage apparatus 213 cannot be displayed. The popup screen 841 from FIG. 11A is one example of a display to the effect that there is an error hindering the use of the extended storage apparatus 213.

As has been explained above, according to the Second Embodiment, when a user attempts to display the held print job list screen 620 immediately after the image processing apparatus 103 has been restarted from sleep mode, the popup screens 801, and 841 are displayed according to the state of the extended storage apparatus 213. It is thereby possible to notify the user of whether or not the image processing apparatus 103 is in a state in which it can properly display the held print job list screen 610, and the usability is increased.

Third Embodiment

Incidentally, it is preferable if the held print job list screen is display is performed while also taking into consideration cases in which the extended storage apparatus 213 has been physically removed from the USB port after the mounting for the extended storage apparatus 213 has been completed. The Third Embodiment will execute processing that can also respond in this case.

Figure 16:
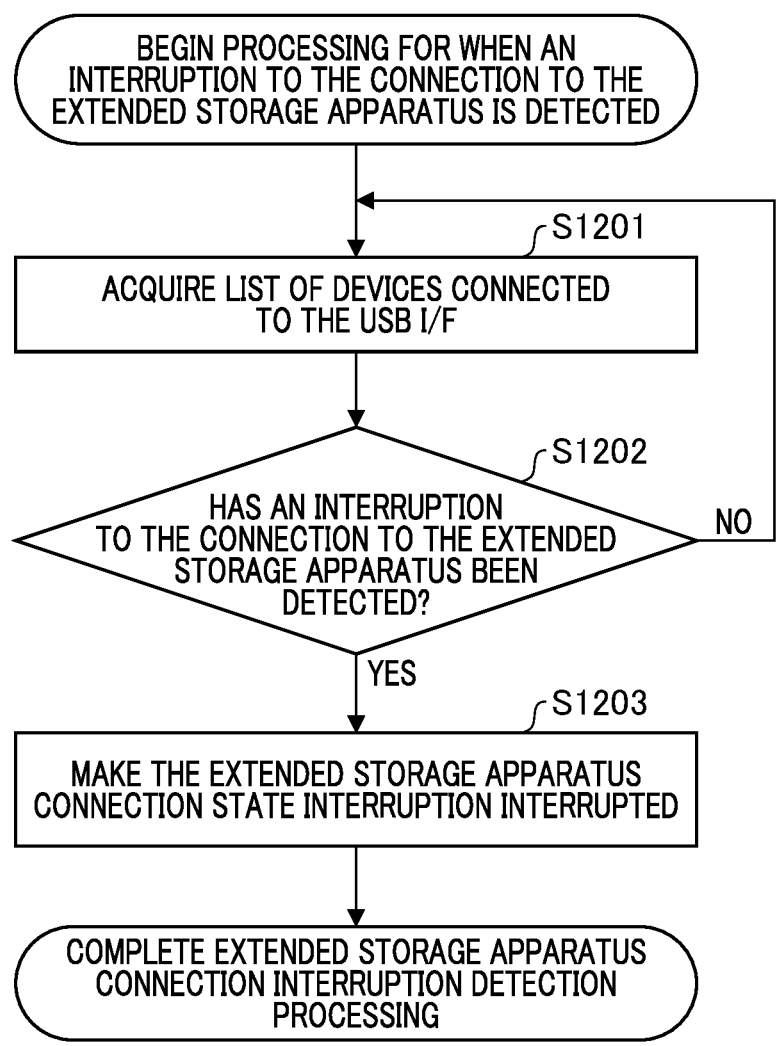
FIG. 16 is a flowchart showing one example of extended storage apparatus connection interruption detection processing for an image processing apparatus.

FIG. 16 is a flowchart showing one example of the extended storage apparatus connection detection processing procedures for the image processing apparatus. FIG. 16 is a flowchart showing the processing for detecting that the extended storage apparatus 213 has been physically removed from the USB port.

During step S1201, the job/device control system 313 acquires a list of devices that are connected to the USB OF 212 and stores this on the RAM 202, then the processing proceeds to step S1202.

During step S1202, the job/device control system 313 determines whether or not the extended storage apparatus 213 has been disconnected. In a case in which the disconnection of the extended storage apparatus 213 has been detected, the job/device control system 313 executes the processing for step S1203. In a case in which the disconnection of the extended storage apparatus 213 is not detected, the job/device control system 313 executes the processing for step S120.

The job/device control system 313 is able to perform the detection of the disconnection of the extended storage apparatus 213 using, for example, the following method. The job/device control system 313 compares the device list that has been stored on the RAM 202 during this execution of step S1201 with the device list that was stored on the RAM 202 during a previous execution of step S1201. The job/device control system 313 is able to detect that a device that is on the previous list but is not on the current list is a device that has been disconnected. Note that in a case in which the job/device control system 313 is executing step S1202 for the first time, there will be no previous device list with which to compare the current list. In this case, the job/device control system 313 determines that it does not detect a disconnection in the following step S1202, and executes the processing for step S1201 again.

During step S1203, the job/device control system 313 stores the connection state of the extended storage apparatus 213 on the RAM 202 as connection interrupted, and the processing is completed.

Figure 17:
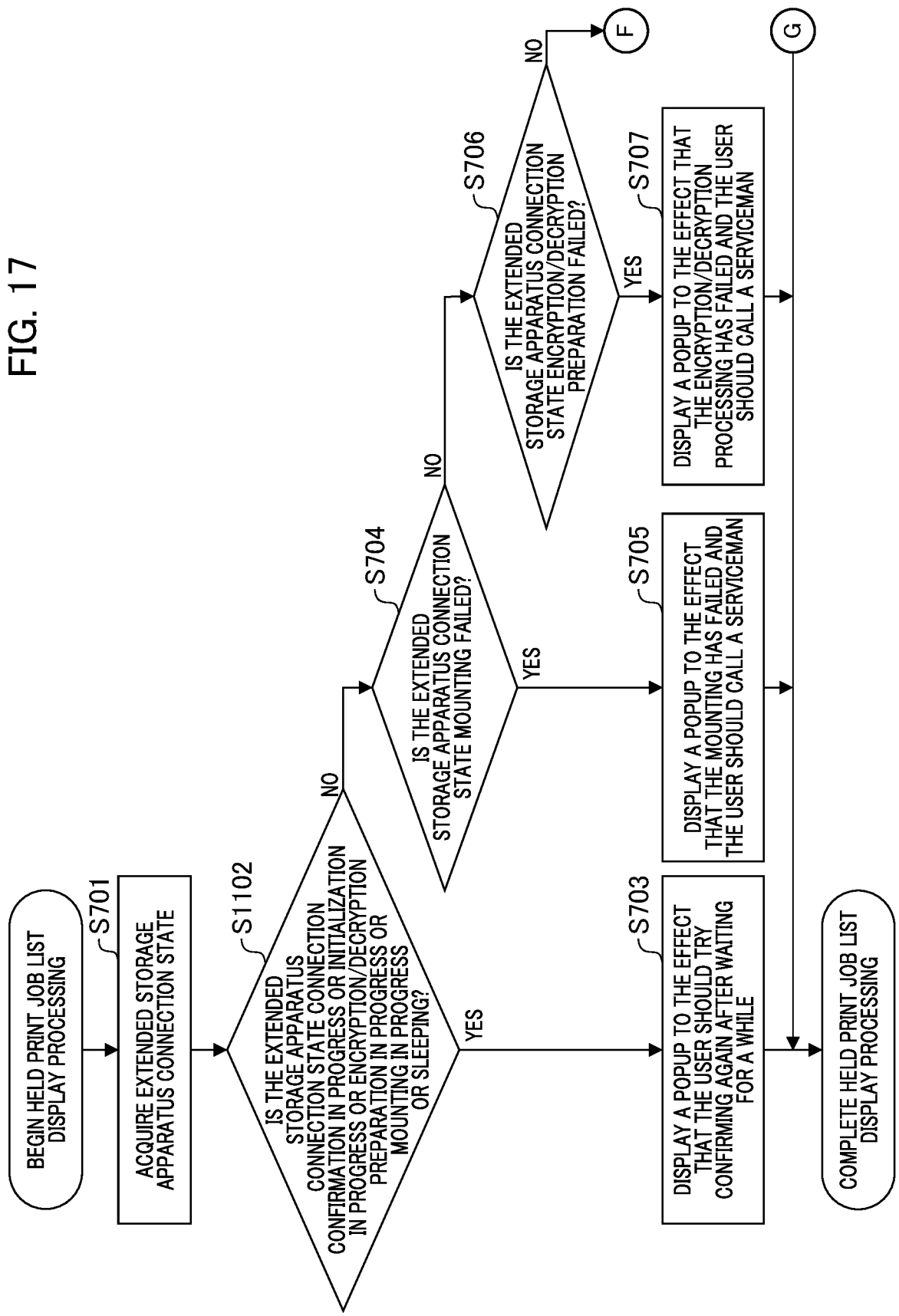
FIG. 17 is a flowchart showing one example of held print job list screen display processing for an image processing apparatus.

FIG. 17 is a flowchart showing an example of the held print job list screen display processing procedures for the image processing apparatus. FIG. 18 is a continuation of FIG. 17, and is a flowchart showing an example of the held print job list screen display processing procedures for the image processing apparatus. FIG. 17 and FIG. 18 are diagrams showing the processing flow in which the print application 354 displays the screen from FIG. 7B. The processing in FIG. 17 and FIG. 18 is processing in which a portion of the branching conditions has been changed from the processing in FIG. 14 and FIG. 15. In FIG. 17 and FIG. 18, processing that is the same as that in FIG. 14 and FIG. 15 is assigned the same reference numerals.

In FIG. 17, and FIG. 18, the processing for the steps other than step S1310 and step S1311 is not different from the processing in FIG. 14 and FIG. 15, and therefore, explanations thereof will be omitted in this embodiment.

During step S1110, the print application 354 determines whether or not the connection state for the extended storage apparatus 213 that has been acquired in step S701 is connection detection failed. In a case in which the connection state is connection detection failed, the print application 354 executes the processing for step S1111. In a case in which the connection state is not connection detection failed, the print application 354 executes the processing for step S1310.

During step S1310, the print application 324 determines whether or not the connection state for the extended storage apparatus 213 that was acquired during step S701 is connection interrupted. In a case in which the connection state is connection interrupted, the print application 354 executes the processing for step S1311. In a case in which the connection state is not connection interrupted, the print application 354 executes the processing for step S710.

Figure 11B:
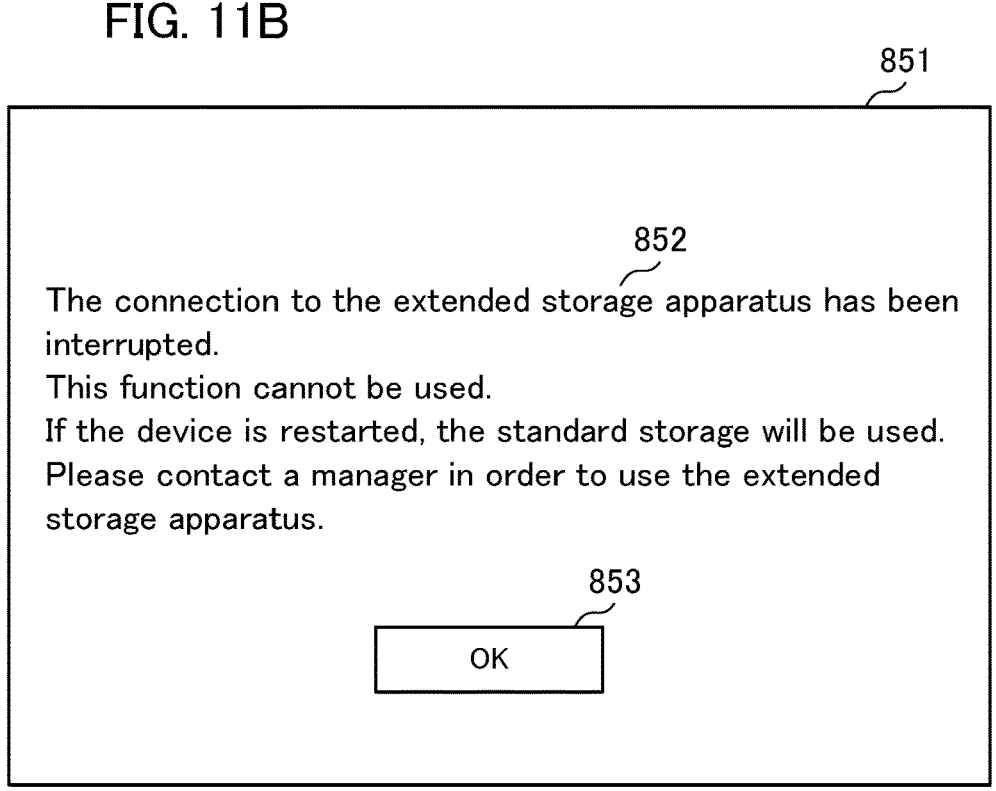

During step S1311, the print application 354 displays a popup on which contents are recorded that communicate the response that the connection to the extended storage apparatus 213 has been interrupted, and therefore please contact a manager to the user, and the processing is completed. Note that during step SS1311, the print application 354 displays the popup screen 851 that is shown in FIG. 11B. This screen is a screen that is displayed on the operating unit 206 by the print application 354 that is executed in the CPU 201 of the image processing apparatus 103.

A display area 852 records a message to the effect that the connection for the extended storage apparatus 213 has been interrupted, and therefore please contact a manger. Upon detecting that an OK button 853 has been pressed by a user, the print application 354 displays the top menu 600. The popup screen 851 from FIG. 11B is one example of a display to the effect that the held print job list that is stored on the extended storage apparatus 213 cannot be displayed. The popup screen 851 from FIG. 11B is also one example of a display to the effect that there is an error hindering the use of the extended storage apparatus 213.

As has been described above, according to the Third Embodiment, when a user attempts to display the held print job list screen 610 after the extended storage apparatus 213 has been physically removed from the USB port, the popup screen 851 is displayed according to the state of the extended storage apparatus 213. It is thereby possible to notify the user of whether or not the image processing apparatus 103 is in a state in which it can properly display the held print job list screen 610, and the usability is increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-131799, filed Aug. 22, 2022, which is hereby incorporated by reference wherein in its entirety.

What is claimed is:

1. An image processing apparatus comprising:
   one or more storage apparatuses storing instructions; and one or more processors executing the instructions causing the image processing apparatus to:

store held print jobs on an extended storage apparatus; and display a list of the held print jobs that have been stored on the extended storage apparatus; and wherein the processor performs a display according to a state of the extended storage apparatus when displaying the list, and wherein the state of the extended storage apparatus is at least one of connection confirmation for the extended storage apparatus in progress, mounting of the extended storage apparatus in progress, mounting of the extended storage apparatus failed, and connection with the extended storage apparatus interrupted.

2. The image processing apparatus according to claim 1, wherein the display according to the state of the extended storage apparatus is a display to the effect that the list of held print jobs that has been stored on the extended storage apparatus cannot be displayed.

3. The image processing apparatus according to claim 1, wherein the display according to the state of the image processing apparatus includes a display to the effect that preparation of the extended storage apparatus is in progress.

4. The image processing apparatus according to claim 1, wherein the display according to the state of the extended storage apparatus includes a display to the effect that there is an error hindering the use of the extended storage apparatus.

5. A control method for an image processing apparatus, the control method comprising:

storing held print jobs on an extended storage apparatus;

displaying a list of the held print jobs that have been stored on the extended storage apparatus; and performing a display according to a state of the extended storage apparatus when displaying the list, and wherein the state of the extended storage apparatus is at least one of connection confirmation for the extended storage apparatus in progress, mounting of the extended storage apparatus in progress, mounting of the extended storage apparatus failed, and connection with the extended storage apparatus interrupted.

6. A non-transitory storage medium storing a control program of an image processing apparatus, the control program causing a computer to perform each step of a control method for the image processing apparatus, the control method comprising:

storing held print jobs on an extended storage apparatus;

display a list of the held print jobs that have been stored on the extended storage apparatus; and performing a display according to a state of the extended storage apparatus when displaying the list, and wherein the state of the extended storage apparatus is at least one of connection confirmation for the extended storage apparatus in progress, mounting of the extended storage apparatus in progress, mounting of the extended storage apparatus failed, and connection with the extended storage apparatus interrupted.

7. The image processing apparatus according to claim 1, wherein the one or more processors execute the instructions stored on the one or more storage apparatuses to access the external storage apparatus.

8. The image processing apparatus according to claim 7, wherein the one or more processors access the external storage apparatus via a USB interface.

* * * * *